US008846950B2

United States Patent
Veige et al.

(10) Patent No.: US 8,846,950 B2
(45) Date of Patent: Sep. 30, 2014

(54) TRIANIONIC PINCER LIGANDS, A CR(III)/CR(V) CATALYTIC SYSTEM AND ITS USE FOR CATALYTIC AEROBIC OXIDATION OF ORGANIC SUBSTRATES

(75) Inventors: Adam Steven Veige, Gainesville, FL (US); Joseph Michael Falkowski, Chapel Hill, NC (US); Matthew O'Reilly, Gainesville, FL (US); Subramaniam Kuppuswamy, Gainesville, FL (US); Kevin P. McGowan, Gainesville, FL (US); Soumya Sarkar, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 395 days.

(21) Appl. No.: 13/254,510

(22) PCT Filed: Mar. 3, 2010

(86) PCT No.: PCT/US2010/026034
§ 371 (c)(1),
(2), (4) Date: Sep. 2, 2011

(87) PCT Pub. No.: WO2010/101993
PCT Pub. Date: Sep. 10, 2010

(65) Prior Publication Data
US 2011/0313174 A1 Dec. 22, 2011

Related U.S. Application Data

(60) Provisional application No. 61/156,946, filed on Mar. 3, 2009.

(51) Int. Cl.
| C07D 403/10 | (2006.01) |
| C07C 211/65 | (2006.01) |
| C07F 11/00 | (2006.01) |
| C07C 211/55 | (2006.01) |
| C07C 211/42 | (2006.01) |

(52) U.S. Cl.
USPC ........... 548/402; 549/212; 548/406; 548/455; 564/308; 564/337

(58) Field of Classification Search
None
See application file for complete search history.

(56) References Cited

FOREIGN PATENT DOCUMENTS

JP 2006-176527 7/2006

OTHER PUBLICATIONS

Dieng, P.S. et al. "Synthesis of a chiral asymmetrical NCN ligand and its metallation" *C.R. Chimie*, 2009, 12:560-564.
Hoogervorst, W.J. et al. "*trans*-Arylplatinum (II) Methyl Compounds Containing a Bis(imino)aryl [NCN] Ligand" *Organometallics*, 2004, 23(5):1161-1164.
Koller, J. et al. "Synthesis and Characterization of (2,6-PrNCN)HfCl$_2$$^-$ and (3,5-MeNCN)$_2$Hf$^{2-}$ (where NCN=2,6-bis[phenylazanidyl]methylphenyl): New Trianionic Pincer Ligands" *Organometallics*, 2007, 26(22):5438-5441.
O'Reilly, M. et al. "Catalytic Aerobic Oxidation by a Trianionic Pincer Cr$^{III}$/Cr$^V$ Couple" *Inorg. Chem.*, 2009, 48(23):10901-10903.
Sarkar, S. et al. "Synthesis, Characterization, and Reactivity of a d$^2$, Mo(IV) Complex Supported by a New OCO-Trianionic Pincer Ligand" *J. Am. Chem. Soc.*, 2008, 130(4):1116-1117.

*Primary Examiner* — Michael Barker
(74) *Attorney, Agent, or Firm* — Saliwanchik, Lloyd & Eisenschenk

(57) ABSTRACT

An embodiment of the invention is a novel Cr(V)OCO$^{3-}$ trianionic pincer ligand complex. Another embodiment of the invention is a catalytic method for oxidation of a substrate aerobically in the presence of a source of oxygen, where the novel Cr(V)OCO$^{3-}$ trianionic pincer ligand complex acts as the catalyst. The substrate can be a phosphine, amine, sulfide, alkene, alkane or a second metal complex. Another embodiment of the invention is directed to NCN pincer ligands that can form trianionic pincer ligand complexes.

18 Claims, 22 Drawing Sheets

US 8,846,950 B2

TRIANIONIC PINCER LIGANDS, A CR(III)/CR(V) CATALYTIC SYSTEM AND ITS USE FOR CATALYTIC AEROBIC OXIDATION OF ORGANIC SUBSTRATES

The subject invention was made with government support under a research project supported by National Science Foundation, Contract No. CHE-0748408. The government has certain rights to this invention.

CROSS-REFERENCE TO RELATED APPLICATIONS

This application is the U.S. national stage application of International Patent Application No. PCT/US2010/026034, filed Mar. 3, 2010, which claims the benefit of U.S. Provisional Application Ser. No. 61/156,946, filed Mar. 3, 2009, the disclosures of which are hereby incorporated by reference in their entireties, including any figures, tables and drawings.

BACKGROUND OF THE INVENTION

Transient, high oxidation state, metal-oxo species are key intermediates in life sustaining biological energy conversion transformations, such as water oxidation at the oxygen-evolving complex (OEC) in photosynthesis II, and cellular substrate oxidation at heme iron in cytochrome P450s, peroxidases, and catalases. Despite the opposite function of the two systems ($O_2$ cleavage; P450, $O_2$ formation; PS II), the principle design feature involves managing oxygen atom transfer (OAT) from highly reactive metal-oxo fragments. In each case, a unique ligand supports an otherwise unstable high oxidation state metal-oxo species. In the oxygen evolving complex of PS II, clustered multiple Mn centers of the S4 Kok state ($Mn(IV)_3Mn(V)$) act as elaborate ligands for a manganyl-oxo intermediate. For P450, heme radical cation formation enables ferryl Fe(IV)=O to exist. Not all high oxidation state metal-oxo species are productive for living systems. For example, Cr(VI) is a carcinogen and causes cellular oxidative DNA damage. However, Cr(VI) is not an active oxidant, instead, ascorbic or glutathione reduction to Cr(III) leads to formation of Cr(IV) and Cr(V) intermediates.

Generating reactive intermediates incurs negative outcomes even nature cannot avoid. Oxidative enzyme degradation pathways are inevitable but protein repair processes are built-in. In artificial systems, the catalytic cycle ends once the ligand degrades, thus limiting turnover. Much of the challenge in developing OAT catalytic systems is to obtain robust, degradation impervious catalysts. To control the geometry and electronic properties of metal ions, chemists create customized ligands to mimic nature. Porphyrin, corrole, catechol, 2-hydroxyacid, and salen ligands can stabilize Cr(V), including a few structurally characterized examples. Some Cr(V)=O oxo complexes are known that participate as catalysts in OAT to sulfides, phosphines, olefins, alkynes, and enantioselective adaptations but are relatively unstable. A stable Cr complex would permit OAT in a commercially viable manner. Hence, there is a need for custom ligands, catalytic systems and their use in catalytic oxidation of organic compounds.

BRIEF SUMMARY OF THE INVENTION

Embodiments of the invention are directed to a Cr(V) $OCO^{3-}$ trianionic pincer ligand complex of the structure:

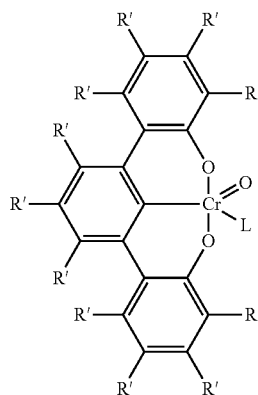

where: R is independently a C3 to C12 alkyl or aryl group; R' is independently a H, $C_1$ to $C_{12}$ alkyl or aryl group; and L is an oxygen comprising ligand. For example, the pincer ligand with R=t-butyl, all R'=H and L=tetrahydrofuran (THF) is a useful for the Cr(V) $OCO^{3-}$ trianionic pincer ligand complex.

Embodiments of the invention are directed to $NCN^{3-}$ ligands that can be used to form trianionic pincer ligand complexes with Cr and other metals. These NCN ligands permit complexes such as that with the above OCO ligands, where a pair of six-member rings or five-member rings includes the NCN anionic sites and metal ion.

Another embodiment of the invention is a catalytic method for oxidation of a substrate that employs the Cr(V) $OCO^{3-}$ trianionic pincer ligand complex as catalyst. A substrate is oxidized by the Cr(V) $OCO^{3-}$ trianionic pincer ligand complex with reduction of the Cr(V) to CR(III), which is oxidized back to the Cr(V) $OCO^{3-}$ trianionic pincer ligand complex by molecular oxygen. The oxidation can be carried out homogeneously in a solvent such as an aliphatic hydrocarbon, aromatic hydrocarbon, or ether. The oxygen source can be pure oxygen or oxygen diluted in an inert gas. The oxygen source can be air. Various substrates can be oxidized including phosphines, amines, sulfides, alkenes, alkanes or other metal complexes.

Another embodiment of the invention is directed to the preparation of Cr(V) $OCO^{3-}$ trianionic pincer ligand complexes. In this method, an $OCOH_3$ pincer ligand is converted to an $OCOHM_2$ pincer complex, the metal ion of the $OCOHM_2$ pincer complex is exchanged with a Cr(III) salt, and the Cr(III) is oxidized to Cr(V). The $OCOH_3$ pincer ligand can be ($^tBuOCO)H_3$, which can be converted to an $OCOHK_2$ pincer complex by reaction with KH. The $OCOHK_2$ pincer complex can undergo metal exchange with the salt $CrCl_2Me(THF)_3$ to yield a Cr(III) $OCO^{3-}$ trianionic pincer ligand complex. The Cr(III) $OCO^{3-}$ trianionic pincer ligand complex can be oxidized by oxygen to the desired Cr(V) $OCO^{3-}$ trianionic pincer ligand complex.

DETAILED DESCRIPTION OF THE INVENTION

Figure 1:
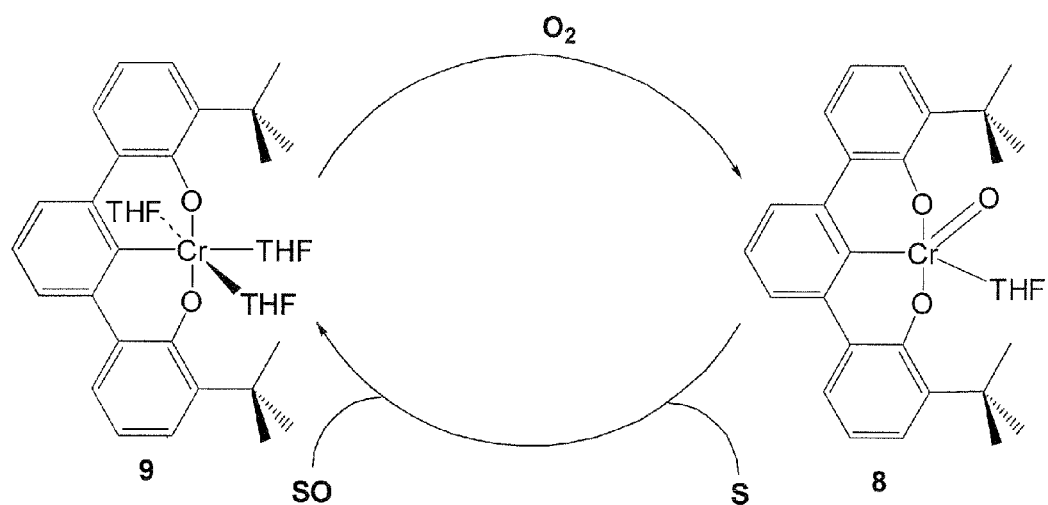
FIG. 1 is a reaction scheme of a catalytic cycle for the oxidation of a substrate using a Cr(V) $OCO^{3-}$ trianionic pincer ligand complex 7 according to an embodiment of the invention.

Embodiments of the invention are directed to Cr(V) complexes stabilized by an trianionic pincer ligand. A novel Cr(V) OCO$^{3-}$ trianionic pincer ligand complex comprises a trianionic pincer ligand of the structure ($^t$BuOCO)H$_3$ (1):

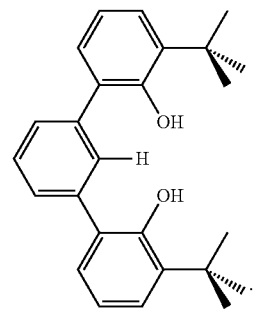

Other OCO$^{3-}$ trianionic pincer ligand can be employed in embodiments of the invention. All carbons in 1 at positions 3,4,5,4',5',6',3'',4'' and 5'' can be independently substituted, for example, with alkyl groups such as methyl, ethyl, n-propyl, i-propyl, n-butyl, i-butyl t-butyl, or larger alkyl groups or any other substituent in a manner that does not inhibit formation of the metal complex, as is obvious to those skilled in the art. For example, large substitution at the two ortho positions to the bonds linking adjacent aryl rings can inhibit co-planarity of the adjacent aromatic rings and inhibit chelation of a metal ion. Other sterically hindering alkyl groups can be substituted for the t-butyl groups of 1.

Other embodiments of the invention are directed to NCN pincer ligands that can form NCN$^{3-}$ complexes with Cr(V), Cr(III) or other metal ions. These NCN pincer ligands form complexes analogous to those formed by 1 where the NCN and metal ions form a pair of six-member rings or a pair of five-member rings in the complex. The NCN pincer ligands are:

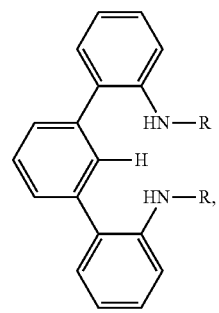

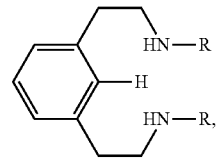

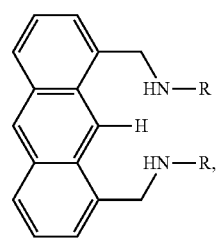

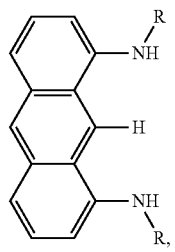

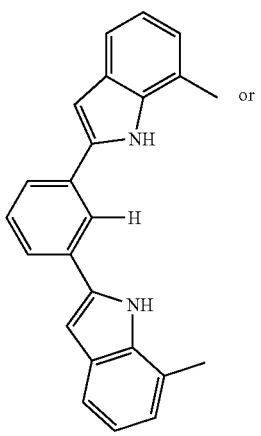

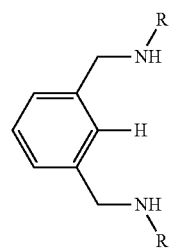

where R is 2,6-bis-(i-propyl)phenyl, 3,5-bis-(methyl)phenyl, 3,5-bis-(trifluoromethyl)phenyl, 3,5-bis-(i-propyl)phenyl, mesytyl, or tri-i-propylsilyl. Again, as with ligand 1 all carbons positions not shown with an H substituent or an N substituent can be independently substituted, for example, with alkyl groups such as methyl, ethyl, n-propyl, i-propyl, n-butyl, i-butyl t-butyl, or larger alkyl groups or any other substituent in a manner that does not inhibit formation of the metal complex, as is obvious to those skilled in the art.

Compound 1 has the ability to replace the three hydrogens shown in the illustrating structure with bonds to a Cr ion for various oxidation states of chromium. The conjugated system remains rigid, forming a stable complex. A Cr(V) OCO$^{3-}$ trianionic pincer ligand complex according to an embodiment of the invention has the structure:

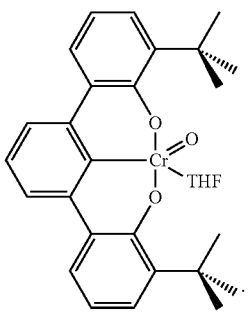

Other Cr(V) OCO$^{3-}$ trianionic pincer ligand complexes according to embodiments of the invention can have OCO$^{3-}$ trianionic pincer ligands where any carbon in the ligand of 8 can be independently substituted at positions 3,4,5,4',5',6',3", 4" and 5", for example, with alkyl groups such as methyl, ethyl, n-propyl, i-propyl, n-butyl, i-butyl t-butyl, or larger alkyl groups or any other substituent that does not inhibit formation of the metal complex, as is obvious to those skilled in the art. Other sterically hindering alkyl groups can be substituted for the t-butyl groups of 8. Other complexing solvent molecules can be substituted for tetrahydrofuran (THF), for example other cyclic ethers. The complex can have the structure:

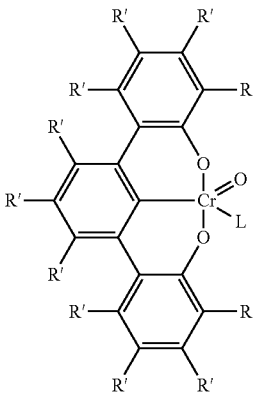

where: R is independently a C3 to C12 alkyl or aryl group; R' is independently a H, C1 to C12 alkyl or aryl group; and L is any neutral coordinating ligand.

The Cr(V) OCO$^{3-}$ trianionic pincer ligand complexes according to embodiments of the invention can be used in a method of aerobic oxidation of a substrate. The method is illustrated in FIG. 1, where OAT occurs between complex 8 and a Cr(III) OCO$^{3-}$ trianionic pincer ligand complex 9 of the structure:

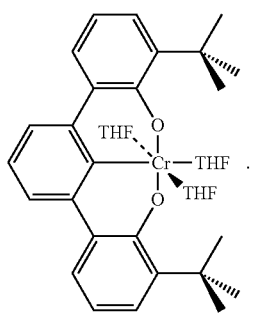

9

Other Cr(V) OCO³⁻ trianionic pincer ligand complexes according to embodiments of the invention can have OCO³⁻ trianionic pincer ligands where any carbon in the ligand of 9 can be independently substituted at positions 3,4,5,4',5',6',3", 4" and 5", for example, with alkyl groups such as methyl, ethyl, n-propyl, i-propyl, n-butyl, i-butyl t-butyl, or larger alkyl groups or any other substituent that does not inhibit formation of the metal complex, as is obvious to those skilled in the art. Other sterically hindering alkyl groups can be substituted for the t-butyl groups of 9. Other complexing solvent molecules can be substituted for tetrahydrofuran (THF), for example other cyclic ethers.

The aerobic oxidation can use oxygen from air or any stream comprising oxygen and any gas or combination of gases that are inert towards 8 and 9. As can be seen in FIG. 1, the Cr(V) OCO³⁻ trianionic pincer ligand complex 8 reacts with a substrate (S) that oxidizes to an oxidized substrate (SO) with the formation of complex 9. The substrate can be a phosphine, amine, sulfide, alkene, alkane or another metal complex. For example: a phosphine, such as triphenyl phosphine, can be oxidized to a phosphine oxide, such as triphenyl phosphine oxide; an amine can be oxidized to an amine oxide: a sulfide can be oxidized to a sulfoxide; an alkene can be oxidized to an epoxy compound; or an active C—H bond of an alkane functionality can be oxidized to an alcohol under homogeneous conditions. The Cr(III) OCO³⁻ trianionic pincer ligand complex 9 is transformed by oxygen back to the Cr(V) OCO³⁻ trianionic pincer ligand complex 8 in the catalytic cycle.

Figure 2:
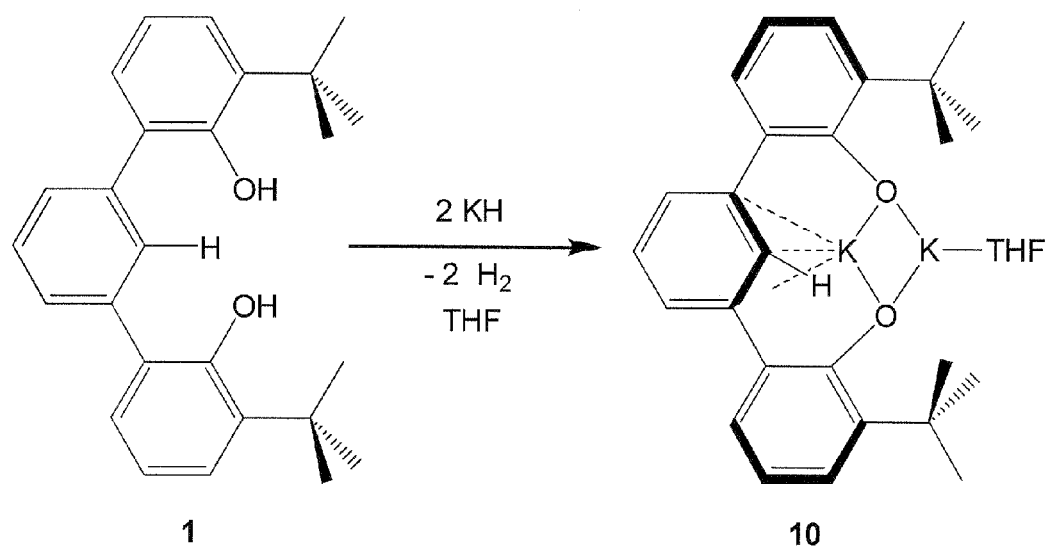
FIG. 2 is a reaction scheme for the transformation of a pincer ligand ($^tBuOCO)H_3$ 1 to dipotassium-3,3"-di-tert-butyl-2,2"-dimethoxy-1,1':3,1"-terphenoxide, ($^tBuOCO)HK_2$ (THF) 9.
Figure 3:
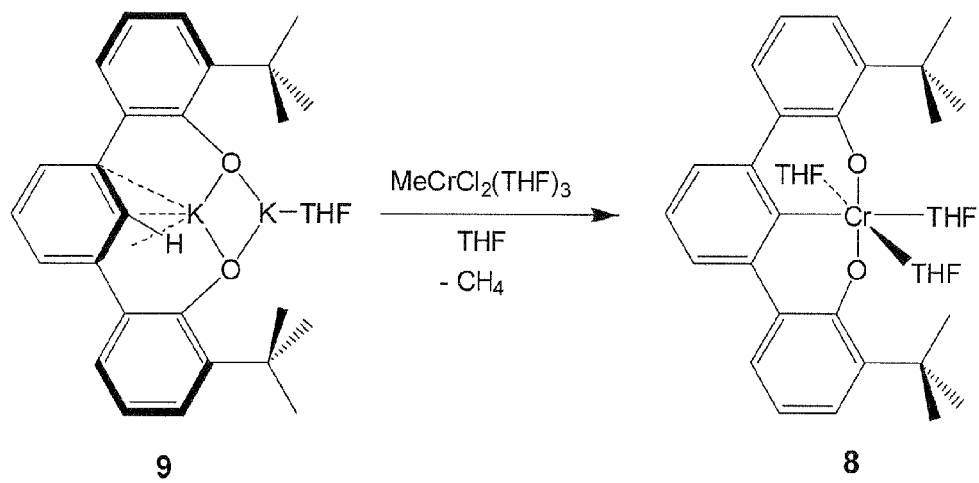
FIG. 3 is a reaction scheme for the transformation of complex ($^t$BuOCO)HK$_2$(THF) 9 to a Cr(III) OCO$^{3-}$ trianionic pincer ligand complex 8.
Figure 4:
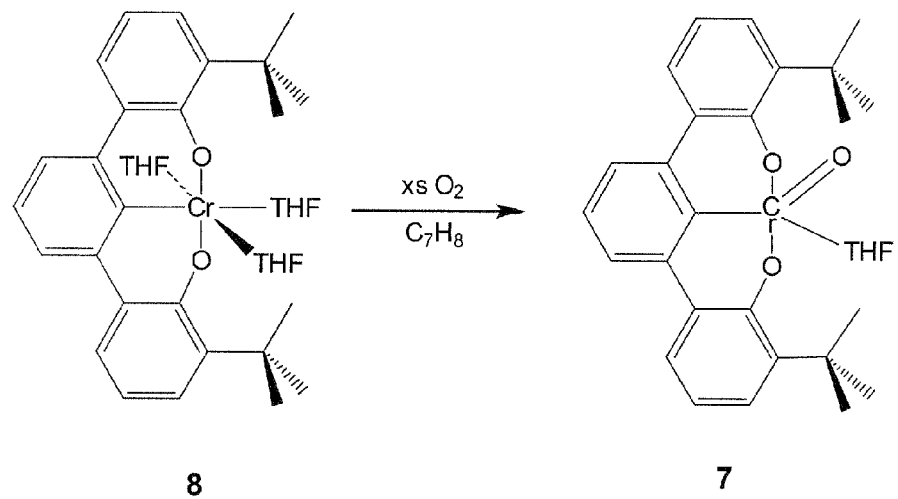
FIG. 4 is a reaction scheme for the transformation of a Cr(III) OCO$^{3-}$ trianionic pincer ligand complex 9 to a Cr(V) OCO$^{3-}$ trianionic pincer ligand complex 8 according to an embodiment of the invention.

An embodiment of the invention is a method for preparing the Cr(V) OCO³⁻ trianionic pincer ligand complex 8. The pincer complex 8 is stable under normal ambient conditions. The catalyst preparation proceeds from (ᵗBuOCO)H₃ (1) or its substituted equivalent by reaction with a metal hydride, for example an alkali metal hydride, for example potassium hydride in THF or other weakly complexing polar aprotic solvents. The transformation from 1 with KH is illustrated in FIG. 2 to yield a dipotassium-3,3"-di-tert-butyl-2,2"-dimethoxy-1,1':3,1'-terphenoxide, (ᵗBuOCO)HK₂(THF) 10. A metal exchange of the alkali metal and chromium can be carried out by double salt metathesis/C—H bond activation between 10 and as shown in FIG. 3 to yield 9. The oxidation of 9 to 8 is shown in FIG. 4 where 9 is oxidized by oxygen in a toluene solution. The catalytic cycle for oxidation of a substrate (S) in FIG. 1, includes an equivalent oxidation of 9 to 8.

Using an NCN pincer ligand, for example with compound 7 above, a Cr(III) trianionic pincer ligand complex, for example the complex:

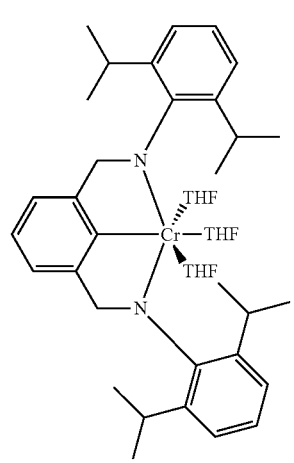

11 that has the NCN trianionic pincer ligand from 7. In like manner to the Cr complex having two five-member rings from 7, complexes from 5, and 6 can be formed. Furthermore, in like manner, Cr complexes having six-membered rings can be formed starting with 2, 3, and 4. Such Cr(III) NCN trianionic pincer complex has the general structure:

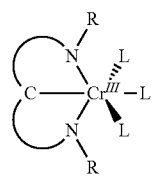

where the portion:

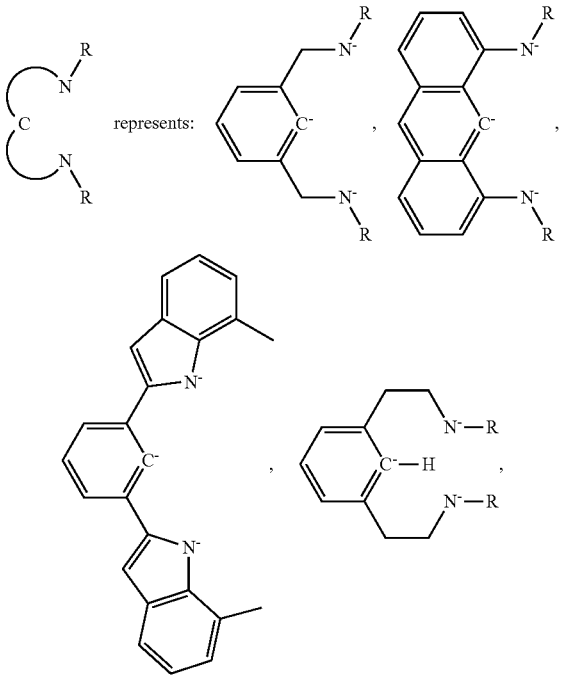

represents:

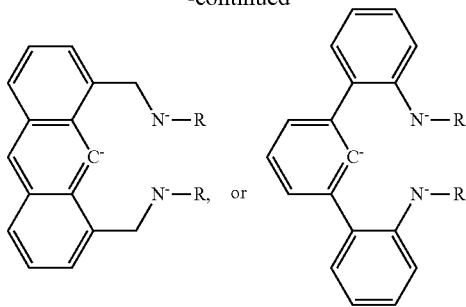

where R is 2,6-bis-(i-propyl)phenyl, 3,5-bis-(methyl)phenyl, 3,5-bis-(trifluoromethyl)phenyl, 3,5-bis-(i-propyl)phenyl, mesytyl, or tri-i-propylsilyl and L is any neutral coordinating ligand. Neutral coordinating ligands can be ethers, for example tetrahydrofuran. The neutral ligands can have an oxygen group.

Materials and Methods

Unless specified otherwise, all manipulations were preformed under an inert atmosphere using standard Schienk or glovebox techniques. Pentane, hexanes, toluene, diethyl ether ($Et_2O$), tetrahydrofuran (THF), and 1,2-dimethoxyethane (DME) were dried using a GlassContour drying column. Benzene-$d_6$ (Cambridge Isotopes) was dried over sodium-benzophenone ketyl, distilled or vacuum transferred, and stored over 4 Å molecular sieves. $CrCl_2Me(THF)_3$ was prepared according to published procedures. All other reagents were purchased from commercial vendors and used without further purification. NMR spectra were obtained on Varian Gemini 300 MHz, Varian Mercury Broad Band 300 MHz, or Varian Mercury 300 MHz spectrometers. Chemical shifts are reported in δ (ppm). For $^1H$ and $^{13}C$ NMR spectra, the solvent peak was referenced as an internal reference. Infrared spectra were obtained on a Thermo scientific Nicolet 6700 FT-IR. Combustion analyses were performed at Complete Analysis Laboratory Inc., Parsippany, N.J.

Synthesis of dipotassium-3,3''-di-tert-butyl-2,2''-dimethoxy-1,1':3,1''-terphenoxide (10)

In a nitrogen filled glovebox, 597 mg (1.59 mmol) of 1 was dissolved in 5 mL of THF. In a separate vial 128 mg (2.01 eq, 3.20 mmol) of potassium hydride was suspended in 2 mL of THF. The solution containing 1 was added to the potassium hydride suspension and stirred vigorously at room temperature for 4 h. The solution was then filtered and all volatiles removed in vacuo to provide a colorless oil. The oil was triturated with pentane (3×1mL) to yield 10 as a white powder (705 mg, 75%). $^1H$ NMR (300 MHz, THF-$d_8$, δ): 7.98 ppm (s, 1H, H$^1$), 7.28 ppm (t, $^3J$=7.79 Hz, 1H, H$^4$), 6.96 ppm (dd, $^3J$=7.33 Hz, $^4J$=1.83 Hz 2H, H$^{3,3'}$), 6.89 ppm (dd, $^3J$=7.79 Hz, $^4J$=2.29 Hz, 2H, H$^{8,8'}$), 6.86 ppm (dd, $^3J$=7.33 Hz, $^4J$=2.29 Hz, 2H, h$^{6,6'}$), 5.99 ppm (dd, J=7.33, $^3J$=7.33 Hz, 2H, H$^{7,7'}$), 1.45 ppm (s, 18H, H$^{12,12'}$). $^{13}C$ NMR (75 MHz, THF-$d_8$, δ): 169.6 ppm (C$^{10,10'}$), 144.7 ppm (C$^{2,2'}$), 137.2 ppm (C$^{9,9'}$), 134.5 ppm (C$^1$), 132.19 ppm (C$^{5,5'}$), 128.55 ppm (C$^4$), 128.07 ppm (C$^{6,6'}$), 126.43 ppm (C$^{3,3'}$), 125.67 ppm (C$^{8,8'}$), 108.17 ppm (C$^{7,7'}$), 35.79 ppm (C$^{11,11'}$), 30.75 ppm (C$^{12,12'}$) Anal. Calcd for $C_{30}H_{36}CrK_2O_3$; C, 68.92%; H, 6.94%. Found; C, 68.53%; H, 7.43%.

Synthesis of ['BuOCO]Cr(THF)$_3$ (9)

In a nitrogen filled glove box (368 mg (1.04 mmol) of $CrCl_2Me(THF)_3$ was dissolved in 20 mL of THF. In a separate vial 542 mg (1.04 mmol) of 10 was dissolved in 20 mL of THF. The solution of 10 was then added dropwise to the $CrCl_2Me(THF)_3$ solution with stirring at room temperature and stirred for 5 h. All volatiles were removed in vacuo. Toluene was added and the solution was filtered. The filtrate was evaporated to dryness to provide an oil that was dissolved in a minimal amount of THF and cooled to −35° C. to yield 292 mg 9 as a green crystalline solid (44% yield). $^1H$ NMR (300 MHz, benzene-$d_6$, δ): 8.23 ppm (br s), 4.90 ppm (br s), 1.45 ppm (br s), −7.48 ppm (br s), −13.30 ppm (br s). Selected IR data of 9 (neat film): ν (cm$^{-1}$) 1390 (s), 1250 (s), 1260 (w), 1125 (w), 1063 (m), 1010 (m), 850 (s), 840 (w), 812 (w). Anal. Calcd for $C_{38}H_{48}CrO_5$; C, 71.67%; 7.60%. Found; C, 71.24%; H, 8.16%.

Synthesis of {['BuOCO]Cr=O(THF) (8)

In a nitrogen filled glove box, 89 mg (0.140 mmol) of 3 was dissolved in 15 mL of toluene. The reaction vessel was fitted with a y-adapter and attached to a Schlenck line. The solution was degassed and then $O_2$ gas was admitted (1 atm). The solution quickly turned purple then over the course of 2 h turned red brown. The solution was then degassed and the volatiles removed in vacuo yielding 58 mg of 8 as brown powder (41% yield). The solid can be recrystallized by dissolving the brown powder in a minimal amount of toluene and cooling the solution to −35° C. $^1H$ NMR (300 MHz, benzene-$d_6$, δ) 11.4 ppm (br s), 9.04 ppm (br s), 4.23 ppm (br s), 137 ppm (br s), 1.21 (br s). Selected IR data of 8 (neat film): ν (cm$^{-1}$) 1577 (w), 1549 (w), 1471 (w), 1410 (s), 1359 (w), 1320 (w), 1242 (m), 1193 (m), 1110 (w), 1054 (w), 988 (s), 875 (m), 858 (w), 838 (w). Anal. Calcd for $C_{60}H_{70}Cr_2O_8 \cdot C_7H_8$; C, 72.15%; H, 7.05%. Found; C, 72.37%; H, 6.68%.

As shown in FIG. 2, upon addition of 1 to a dispersion of potassium hydride in THF, hydrogen gas evolves and the solution forms a pale yellow color. Filtration of any excess KH followed by concentration of the filtrate provides a colorless oil. Repeated trituration of the oil with pentane removes residual THF and provides 10 as a white solid in 75% yield. The salt is unstable in chloroform and sparingly soluble in benzene. $^1H$ and $^{13}C$ {$^1H$} NMR spectra are instead obtained in THF-$d_8$. Resonances corresponding to phenol-OH's are absent in the $^1H$ NMR spectrum of 10. The protons from the THF associated with 9 appear as broad singlets upfield from the residual protio solvent peaks at 3.59 and 1.74 ppm. The ipso-proton on the central aromatic ring resonates at 7.98 ppm and includes a weak $^4J_{H-H}$ coupling to the two meta-protons. A $^1H$-$^1H$ COSY spectrum also reveals this coupling in addition to a long-range coupling to the para-proton. COSY, HETCOR, and gHMBC spectroscopic techniques enable identification assignment of each proton and carbon resonance.

Figure 5A:
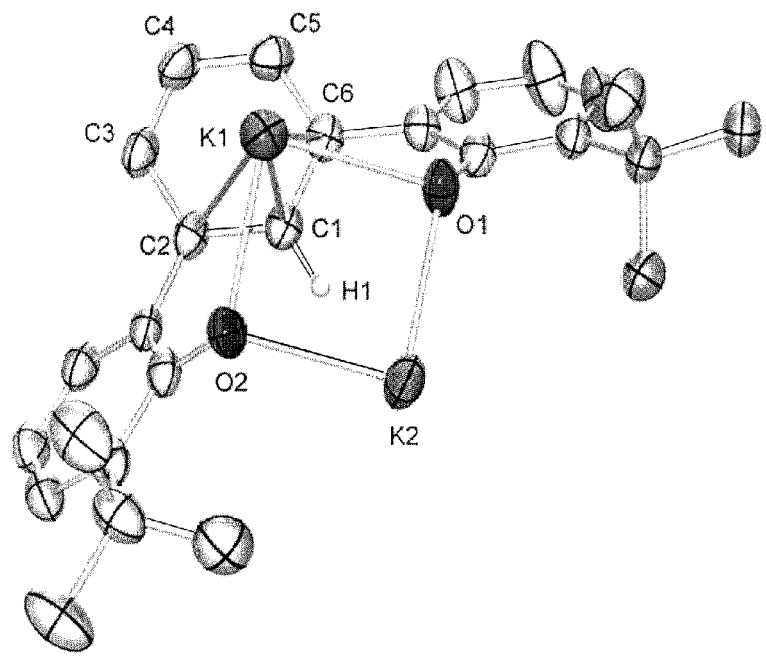
FIG. 5 is: A an ORTEP representation of ($^t$BuOCO)HK$_2$ (THF) (10) with ellipsoids drawn at the 50% probability level (H-atoms and a THF solvent molecule bound to K1 are omitted for clarity; and B Molecular structure of 10 depicting K-π-interactions ($^t$Bu groups, H-atoms and THF omitted for clarity).
Figure 5B:
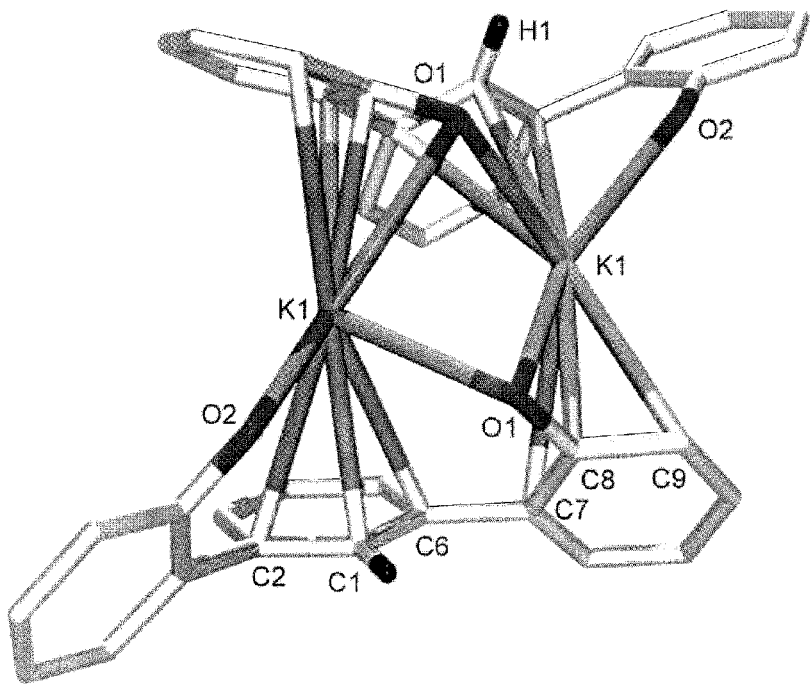

A single-crystal X-ray experiment elucidates the exact orientation of the K$^+$ ion, the THF molecule, and the terphenyl fragment. FIG. 5 depicts the molecular structure of 8, Table 1 lists selected bond lengths and angles, and Table 2 contains pertinent crystallographic data. The asymmetric unit consists of one dipotassium unit and a THF molecule. This unit propagates in a two-dimensional sheet via K$^+$-arene π-interactions. Three close contacts between K1 and the central aromatic ring (d(K1−C1)=2.966(3), d(K1−C2)=3.128(3), and d(K1−C6)=3.162(3) Å) and three additional connections to an adjacent molecule in the lattice (d(K1−C7)=3.282(3), d(K1−C8)=2.895(3), and d(K1−C9)=3.218(3) Å) complete the two-dimensional network.

TABLE 1

Selected bond lengths and angles for compounds 10.

| Bond Length (Å) | | Angle (°) | |
|---|---|---|---|
| K1—C1 | 2.966(3) | O1—K1—O2 | 86.26(7) |
| K1—C2 | 3.128(3) | O1—K2—O2 | 88.61(7) |
| K1—C6 | 3.162(3) | K1—O1—K2 | 86.99(7) |
| K1—O1 | 2.780(2) | K1—O2—K2 | 92.50(7) |
| K1—O2 | 2.601(2) | K1—C1—H1 | 104.0(19) |
| K2—O1 | 2.673(3) | C2—C1—C6 | 122.2(3) |
| K2—O2 | 2.596(2) | O1—K1—C1 | 62.39(8) |
| K1—K2 | 3.7543(11) | O2—K1—C1 | 65.21(8) |
| K2—H1 | 2.93(3) | C2—K1—C6 | 45.86(8) |

TABLE 2

X-ray crystallographic structure parameters and refinement data for 10.

| | |
|---|---|
| empirical formula | $C_{30}H_{36}K_2O_3$ |
| formula weight | 522.79 |
| crystal system | Monoclinic |
| space group | C2/c |
| crystal dimensions (mm) | 0.17 × 0.14 × 0.13 |
| a (Å) | 18.3698(16) |
| b (Å) | 18.2304(15) |
| c (Å) | 16.6555(14) |
| β (deg) | 94.661(2) |
| volume (Å$^3$) | 5559.3(8) |
| Z (Å) | 8 |
| absorption coeff (mm$^{-1}$) | 0.369 |
| F (000) | 2224 |
| $D_{calcd}$ (g/cm$^3$) | 1.249 |
| γ (Mo Kα) (Å) | 0.71073 |
| Temperature (K) | 173(2) |
| θ range (deg) | 1.58 to 27.50 |
| completeness to θ$_{max}$ | 99.7% |
| index ranges | −23 ≤ h ≤ 23, −23 ≤ k ≤ 14, −20 ≤ l ≤ 21 |
| reflections collected | 18576 |
| indep reflections [R$_{int}$] | 6361 [0.0591] |
| data/restraints/param | 6361/61/328 |
| final R$_1$ indices [I > 2σ(I)] | R1 = 0.0737, wR2 = 2203 [4418] |
| R indices (all data) | R1 = 0.0977, wR2 = 0.2376 |
| largest diff peak/hole e.Å$^{-3}$ | 1.569/−0.662 |
| goodness of fit on F$^2$ | 1.053 |

Synthesis and Characterization of [$^t$BuOCO]Cr$^{III}$(THF)$_3$ (9)

As shown in FIG. 3 Upon addition of 10 to MeCrCl$_2$(THF)$_3$ species in THF, the solution instantly darkens from lime green to dark green. After 5 hours, solvent removal provides a green solid that is extracted into toluene and KCl removed by filtration. After removing the toluene in vacuo, the solids remaining are dissolved in minimal THF and cooled to −35° C. to induce crystallization and produces analytically pure 9 in 44% yield.

Figure 6:
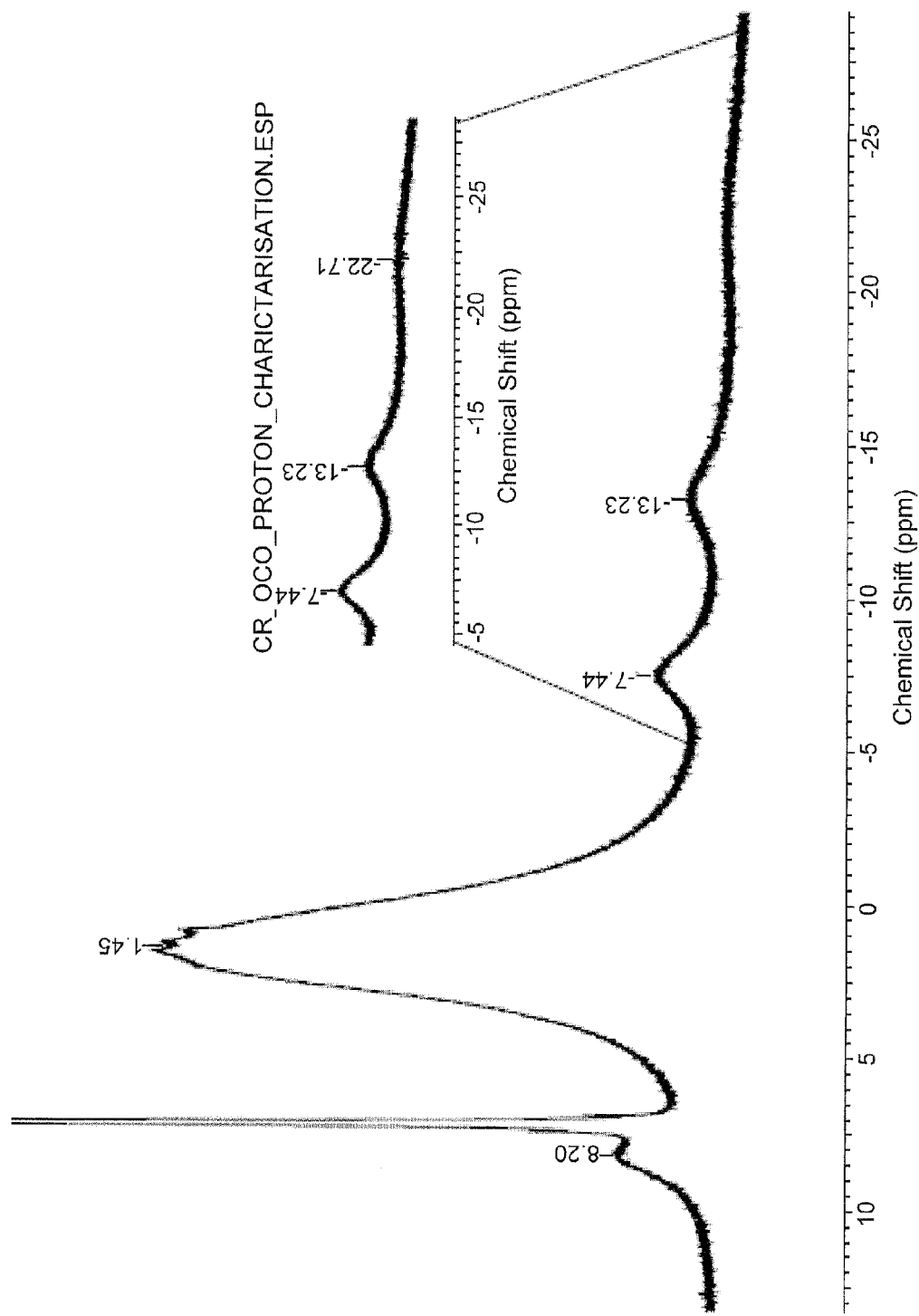
FIG. 6 is a $^1$H NMR spectrum of [$^t$BuOCO]Cr$^{III}$(THF)$_3$ (9) displaying broad paramagnetically shifted resonances.

A $^1$H NMR spectrum of 9 presented in FIG. 6 reveals paramagnetically shifted and broadened resonances. The signals appear at 8.20 (v$_{1/2}$=518), 1.45 (v$_{1/2}$=1035; $^t$Bu), −7.44 (v$_{1/2}$=645), −13.23 (v$_{1/2}$=750), and −22.71 (v$_{1/2}$=2520) ppm. No resonances were observed in the $^{13}$C {$^1$H} NMR spectrum of 9. Unfortunately, the $^1$H spectrum is not useful to confirm the identity of 9. However, enough information is available (location of resonances and v$_{1/2}$) to determine if subsequent reactions lead to new chromium-containing products. The resonance at 1.45 ppm corresponds to the combined protons from the $^t$Bu groups and the three THF ligands bound to Cr(III).

Figure 7:
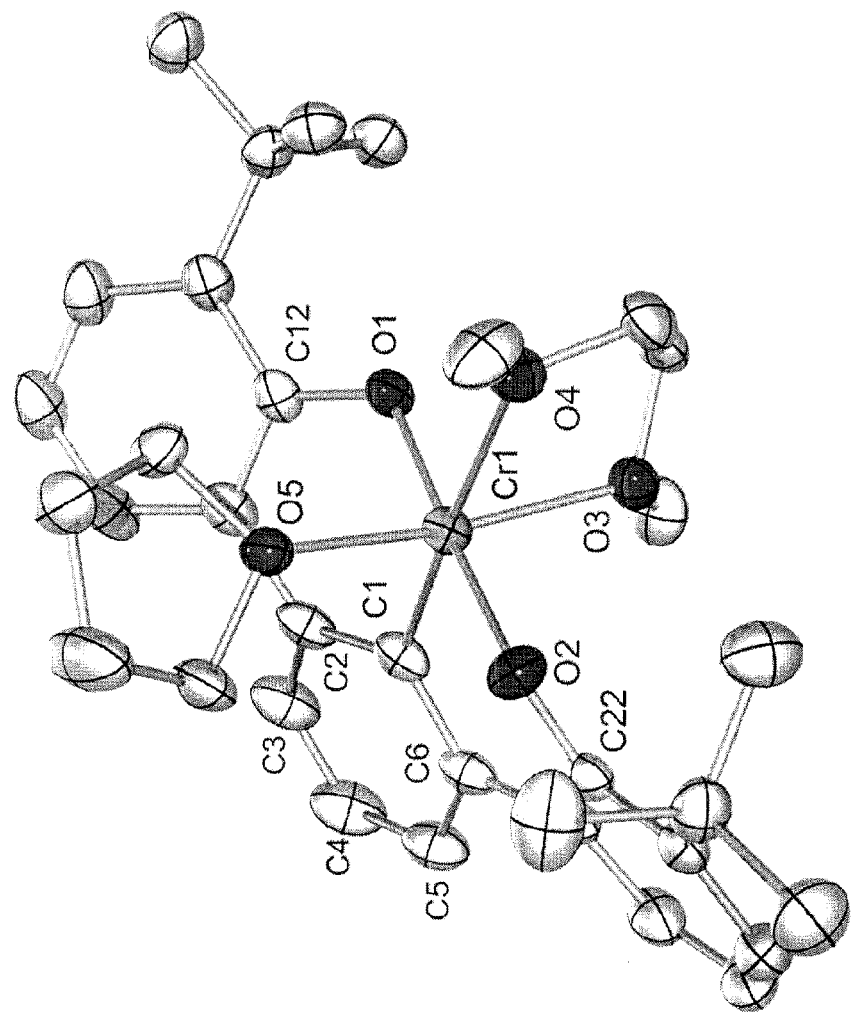
FIG. 7 is an ORTEP representation of [$^t$BuOCO]Cr$^{III}$ (THF)(DME) (9-DME) with ellipsoids drawn at the 50% probability level and hydrogen atoms removed for clarity.

1,2-dimethoxyethane yields crystals that retain solvent for a time sufficiently long enough to obtain X-ray data. As a consequence of recrystallizing in DME, two THF molecules are replaced in the Cr(III) coordination sphere with one DME. The structure of 9-DME is presented in FIG. 7, Table 3 list pertinent bond lengths and angles, and Table 4 provides the crystallographic data.

TABLE 3

Selected bond lengths and angles for compounds 9-DME.

| Bond Length (Å) | | Angle (°) | |
|---|---|---|---|
| Cr1—C1 | 1.994(3) | O1—Cr1—O2 | 177.42(9) |
| Cr1—O1 | 1.927(2) | C1—Cr—O5 | 93.67(11) |
| Cr1—O2 | 1.909(2) | C1—Cr1—O3 | 98.75(11) |
| Cr1—O3 | 2.086(2) | C1—Cr1—O4 | 174.98(11) |
| Cr1—O4 | 2.188(2) | O3—Cr1—O4 | 76.46(9) |
| Cr1—O5 | 2.049(2) | O1—Cr1—C1—C2 | 29 |

TABLE 4

X-ray crystallographic structure parameters and refinement data for 9-DME.

| | |
|---|---|
| empirical formula | $C_{38}H55CrO_7$ |
| formula weight | 675.82 |
| crystal system | Monoclinic |
| space group | P2(1)/n |
| crystal dimensions (mm) | 0.19 × 0.14 × 0.03 |
| a (Å) | 10.9230(8) |
| b (Å) | 24.4200(19) |
| c (Å) | 13.5436(11) |
| β (deg) | 97.571(2) |
| volume (Å$^3$) | 3581.1(5) |
| Z (Å) | 4 |
| absorption coeff (mm$^{-1}$) | 0.366 |
| F (000) | 1452 |
| $D_{calcd}$ (g/cm$^3$) | 1.253 |
| γ (Mo Kα) (Å) | 0.71073 |
| Temperature (K) | 173(2) |
| θ range (deg) | 1.67 to 25.00 |
| completeness to θ$_{max}$ | 99.9% |
| index ranges | −12 ≤ h ≤ 12, −27 ≤ k ≤ 28, −11 ≤ l ≤ 16 |
| reflections collected | 20013 |
| indep reflections [R$_{int}$] | 6290 [0.0726] |
| data/restraints/param | 6290/0/415 |
| final R$_1$ indices [I > 2σ(I)] | R1 = 0.00564, wR2 = 0.1271 [4466] |
| R indices (all data) | R1 = 0.0888, wR2 = 0.1417 |
| largest diff peak/hole e.Å$^{-3}$ | 0.555/−0.308 |
| goodness of fit on F$^2$ | 1.038 |

The complex consists of a distorted octahedral Cr(III) coordinated by the OCO$^{3−}$ pincer, THF, and DME ligands. The OCO pincer ligand adopts a pseudo C$_2$-symmetric orientation. As a consequence, the THF and DME ligands are canted towards open space as evidenced by O—Cr—O angles greater than 90° (∠O1-Cr1-O5=93.67(11)° and ∠O2-Cr1-O3=92.12(9)°. A strong trans influence from the Cr—C1 bond (d(Cr1-C1)=1.909(2) Å) causes a 0.1 Å elongation in the Cr1-O4 bond length (d(Cr1-O4)=2.188(2) Å) compared to Cr1-O3 (d(Cr1-O3)=2.086(2) Å). As expected, shorter bonds form between the Cr(III) ion and the alkoxide attachments (d(Cr1-O1)=1.927(2) Å and d(Cr1-O2)=1.909(2) Å).

Synthesis of [$^t$BuOCO]Cr$^V$=O(THF) (8)

Figure 8:
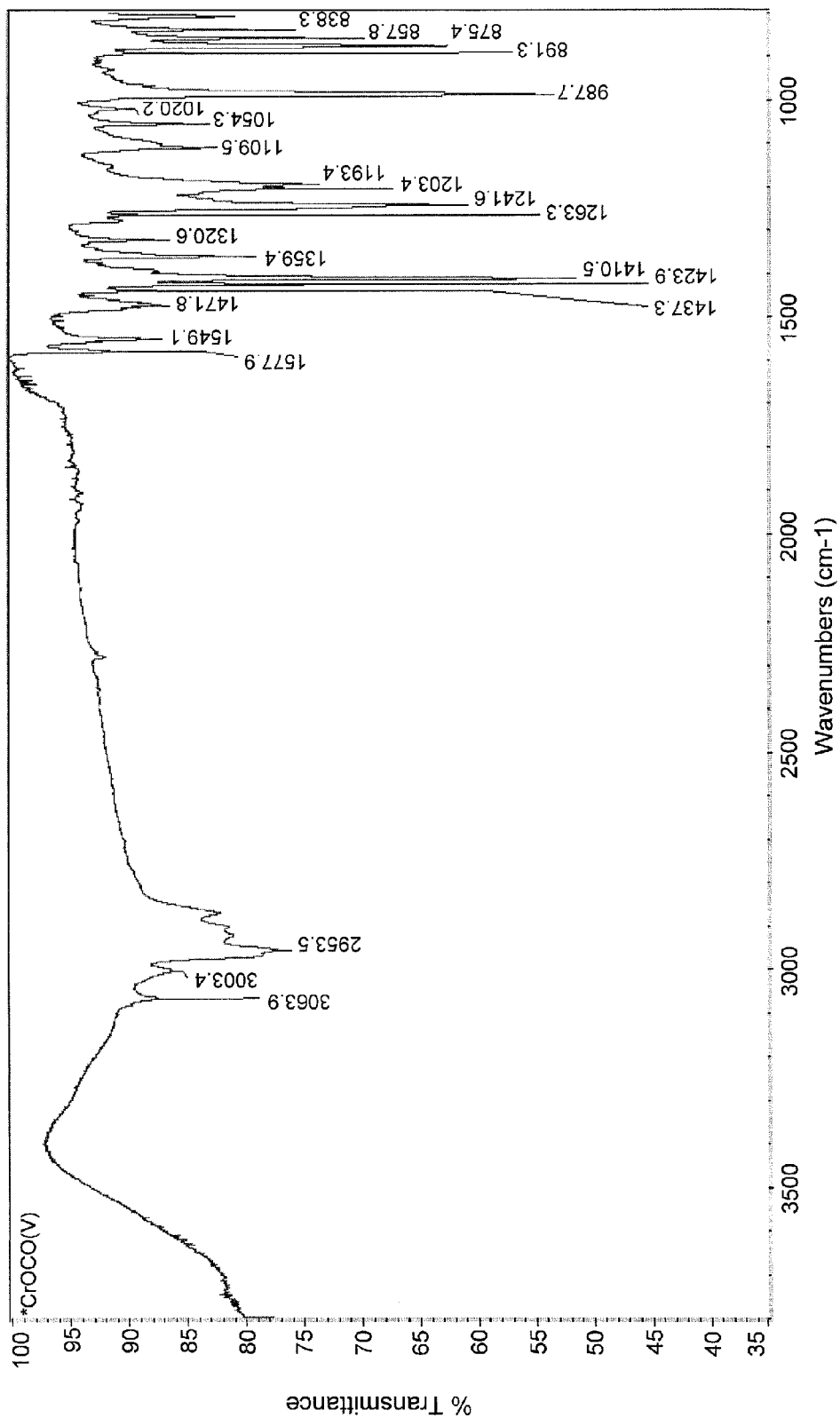
FIG. 8 is an infrared spectrum of Cr(V) [$^t$BuOCO]Cr$^V$=O (THF) (8) according to an embodiment of the invention.

As shown in FIG. 4, when 9 is treated with an excess of O$_2$ (1 atm) in toluene the Cr(V) [$^t$BuOCO]Cr$^V$=O(THF) (8) forms. As the O$_2$ is delivered, the solution color turns from bright green to purple and then to red-brown. After removal of all volatiles a brown powder remains, which can be further purified if necessary by recrystallization from a minimal amount of toluene at −35° C. Though the ¹H NMR spectrum of the brown powder does not reveal its identity, the signals indicate the presence of a new complex. The spectrum of the mixture in $C_6D_6$ exhibits several broad paramagnetically shifted peaks at 11.4, 9.0, 4.3, 2.4, and 1.2 ppm. Addition of THF to the NMR tube causes the signal at 1.2 ppm to grow, and is attributed to a bound THF that can exchange with free THF. FIG. 8 shows the IR spectrum of 8. The $Cr^V$-O stretch appears as a strong absorption at 988 cm⁻¹.

Synthesis of 2, R=Mesityl)

Figure 9:
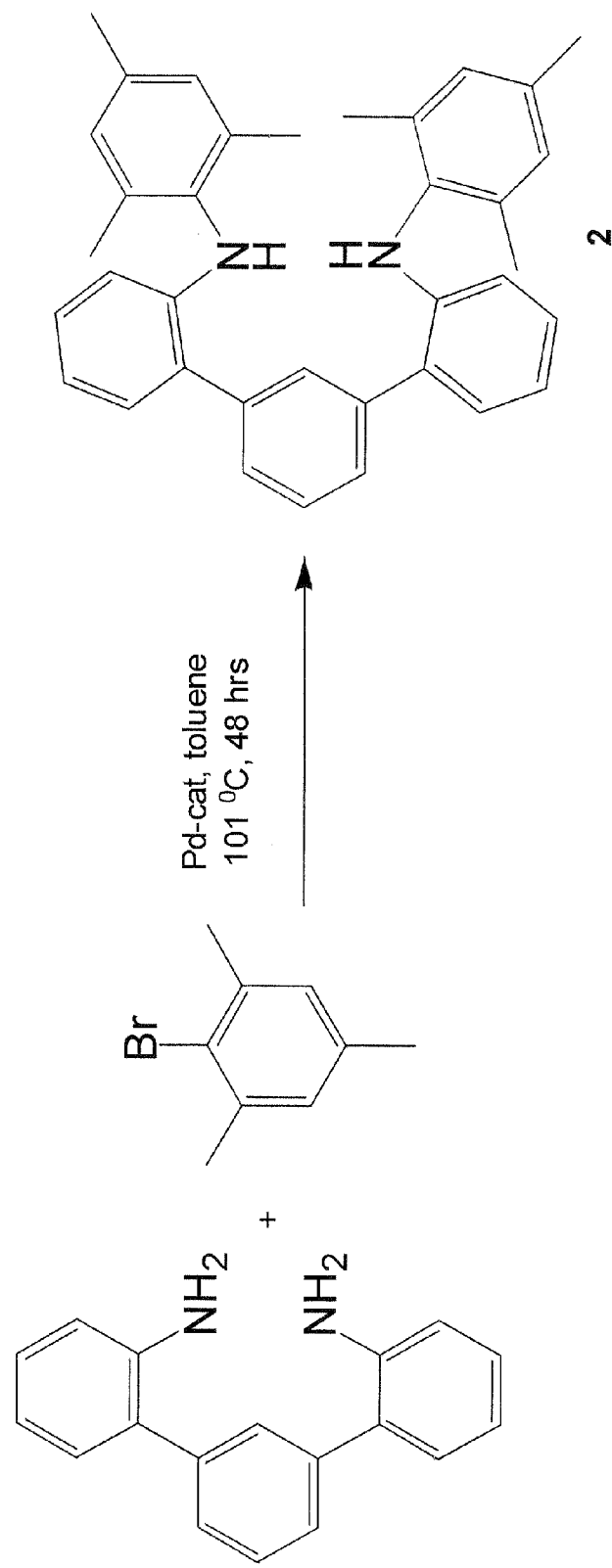
FIG. 9 is a reaction scheme for the preparation of NCN ligand 2—R=mesityl according to an embodiment of the invention.
Figure 10:
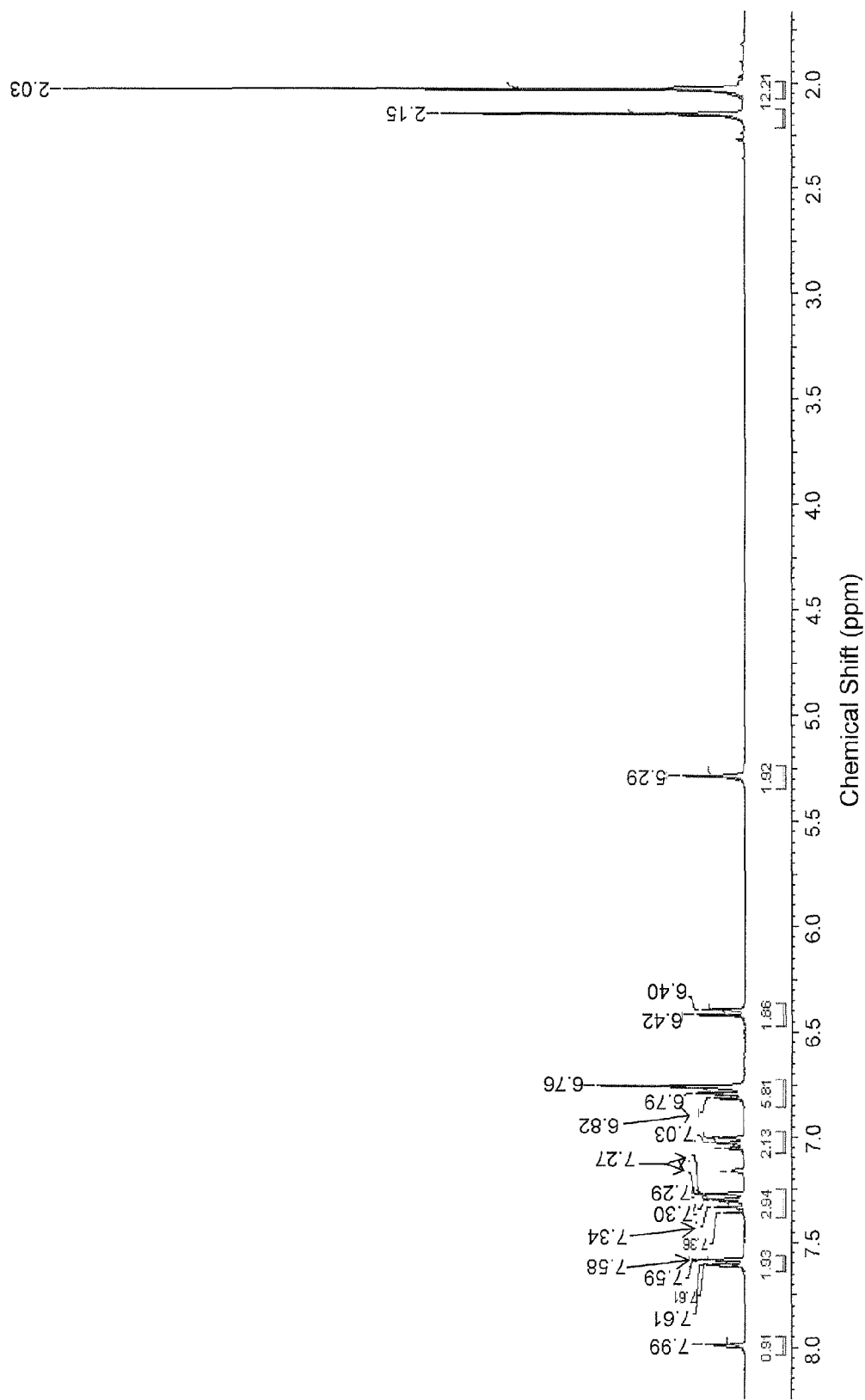
FIG. 10 is a $^1$H NMR spectrum of (2—R-mesityl) in C$_6$D$_6$.
Figure 11:
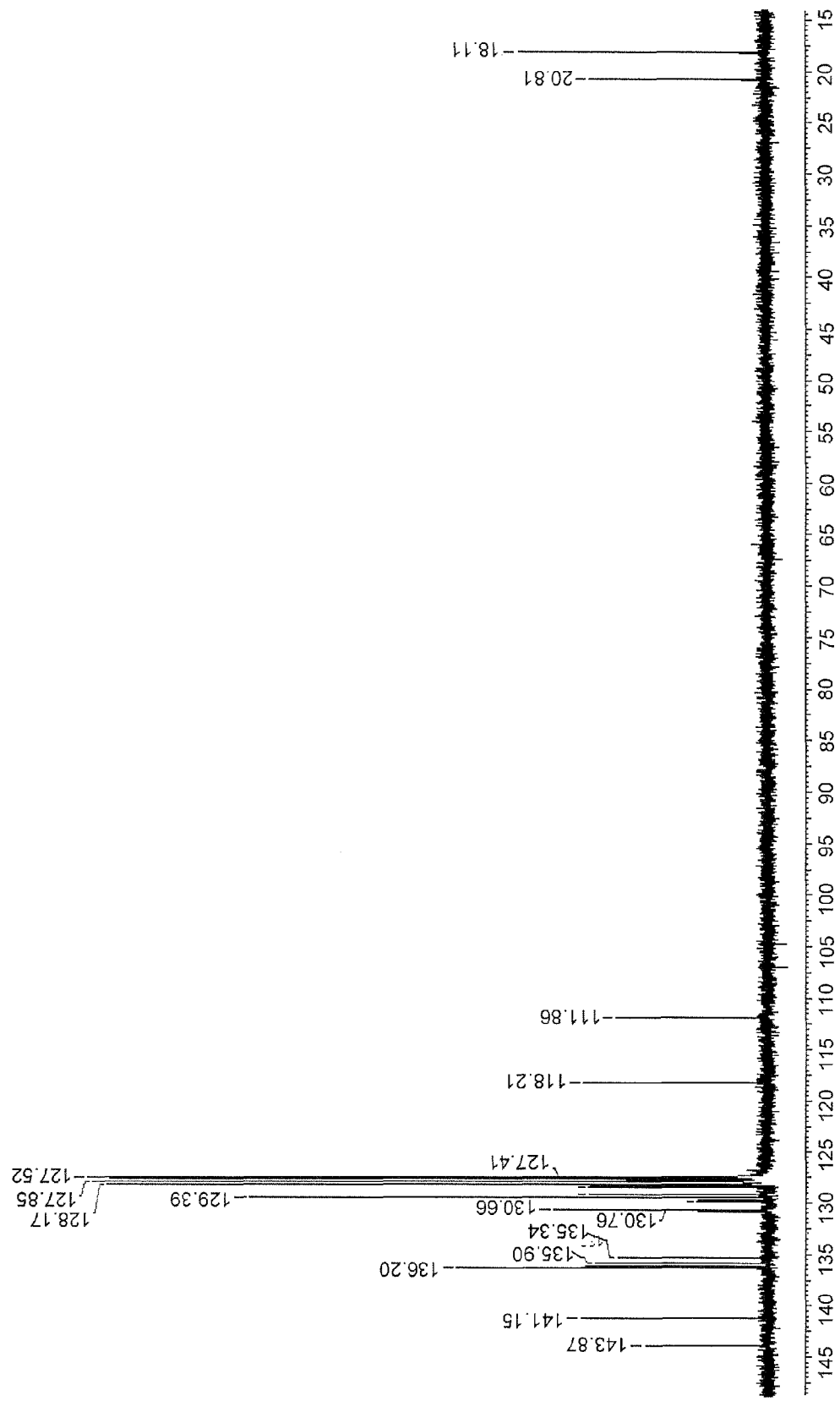
FIG. 11 is a $^{13}$C{$^1$H} NMR spectrum of (2 R=mesityl) in C$_6$D$_6$.

In a glovebox, as shown in FIG. 9, 1,3-benzene-bis(aniline) (0.95 g, 3.7 mmol), tris(dibenzylideneacetone)-dipalladium (0) (0.168 g, 0.183 mmol), rac-2,2'-bis(diphenylphosphino)-1,1'-binaphthyl (0.284 g, 0.455 mmol), sodium tert-butoxide (1.077 g, 11.2 mmol), 40 mL of toluene, and mesityl bromide (6.84 mL, 44 mmol) were combined in a 250 mL, 2-neck round-bottom flask. The reaction mixture was refluxed under argon for 2 days with completion of the reaction confirmed by TLC (10% ethyl acetate: 90% hexanes). The reaction was quenched with 10 mL of water, the solvents removed under vacuum and dried for 2 hours. The crude product was extracted with pentanes and filtered. Colorless crystalline solid was obtained from cool pentanes overnight (730 mg, 38%). ¹H NMR (300 MHz, $C_6D_6$) δ (ppm): 7.99 (s, 1H, Ar—H), 7.59 (d, J=7.6 Hz, 2H, Ar—H), 7.35 (d, J=7.6 Hz, 1H, Ar—H), 7.27-7.33 (m, 2H, Ar—H), 7.03 (t, J=7.6 Hz, 2H, Ar—H), 6.81 (d, J=6.9 Hz, Ar—H), 6.76 (s, 4H, Ar—H), 6.41 (d, J=7.6 Hz, 2H, Ar—H), 5.29 (bs, 2H, N—H), 2.15 (s, 6H, p-Mes-$CH_3$), 2.03 (s, 12H, o-Mes-$CH_3$) as shown in FIG. 10. ¹³C{1H} NMR (75.36 Hz, $C_6D_6$) δ (ppm): 144.4 (s, C, Ar), 141.7 (s, C, Ar), 136.7 (s, C, Ar), 136.4 (s, C, Ar), 135.9 (s, C, Ar), 131.3 (s, C, Ar), 131.2 (s, C, Ar), 130.3 (s, C, Ar), 129.9 (s, C, Ar), 129.0 (s, C, Ar), 128.0 (s, C, Ar), 118.8 (s, C, Ar), 112.4 (s, C, Ar), 21.4 (s, p-Mes-$CH_3$), 18.7 (s, o-Mes-$CH_3$) as shown in FIG. 11. DIP-CIMS, [M–H]⁺=497.2948 ($C_{36}H_{38}N_2$, theoretical=497.2957).

Synthesis of N,N'-(2,2'-(1,3-phenylene)bis(ethane-2,1-diyl))bis(3,5-bis-(trifluoromethy)paniline) (3—R=3,5-bis(trifluoromethylphenyl)

Figure 12:
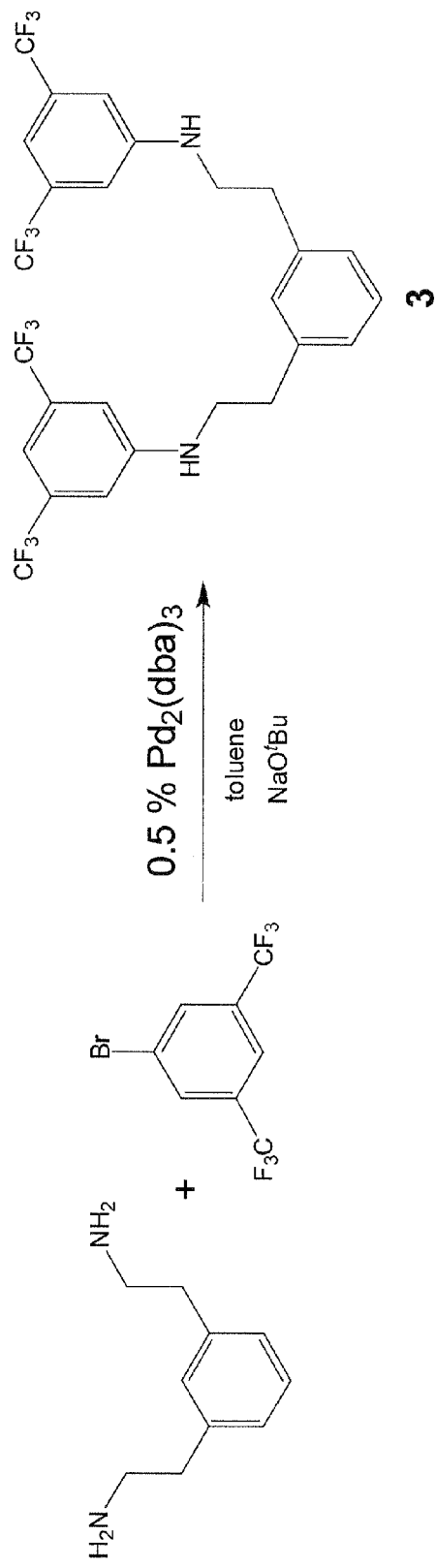
FIG. 12 is a reaction scheme for the preparation of NCN ligand 3—R=3,5-bis-(trifluoromethyl)phenyl according to an embodiment of the invention.
Figure 13:
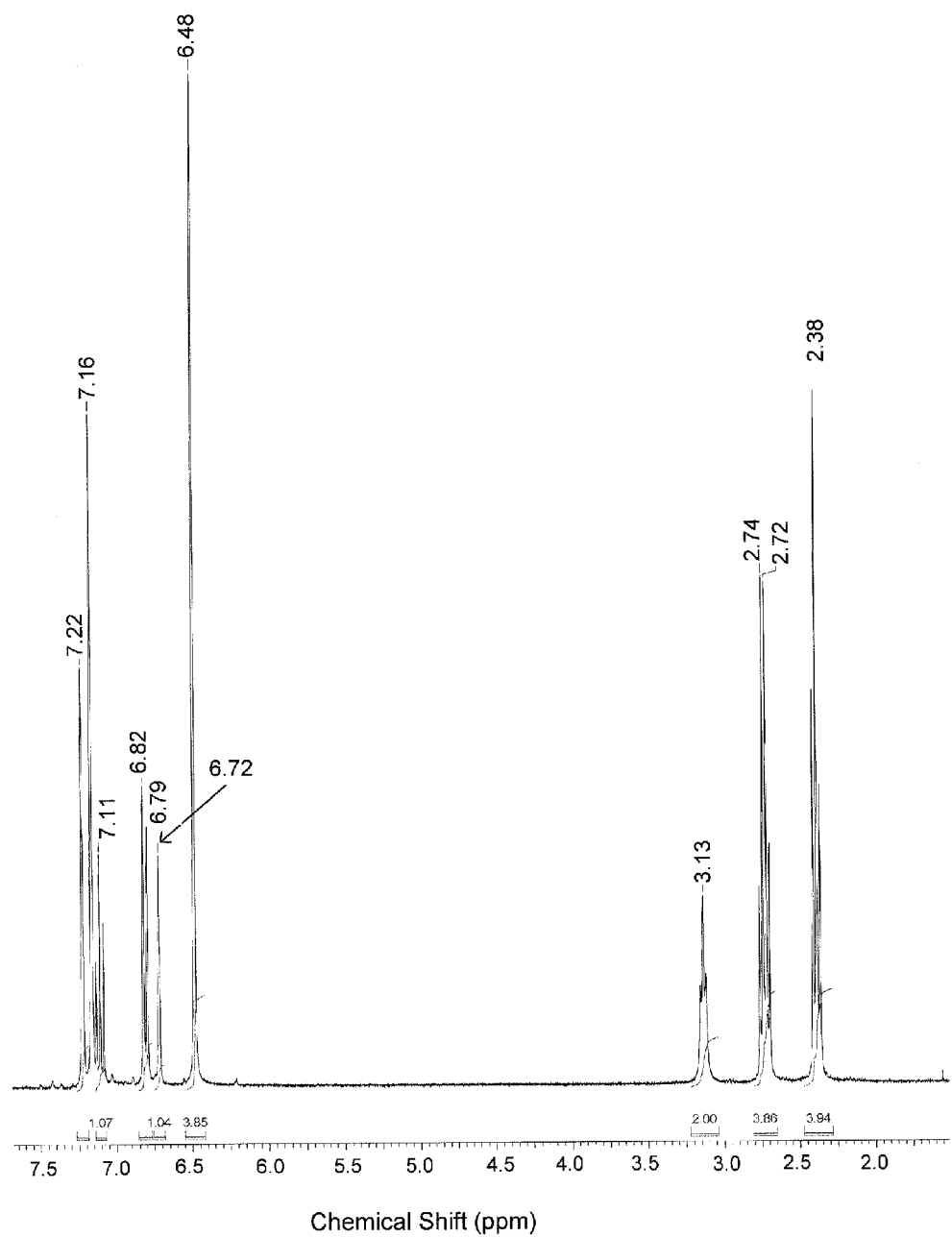
FIG. 13 is a $^1$H NMR spectrum of (3—R=3,5-bis-(trifluoromethyl)phenyl) in C$_6$D$_6$.
Figure 14:
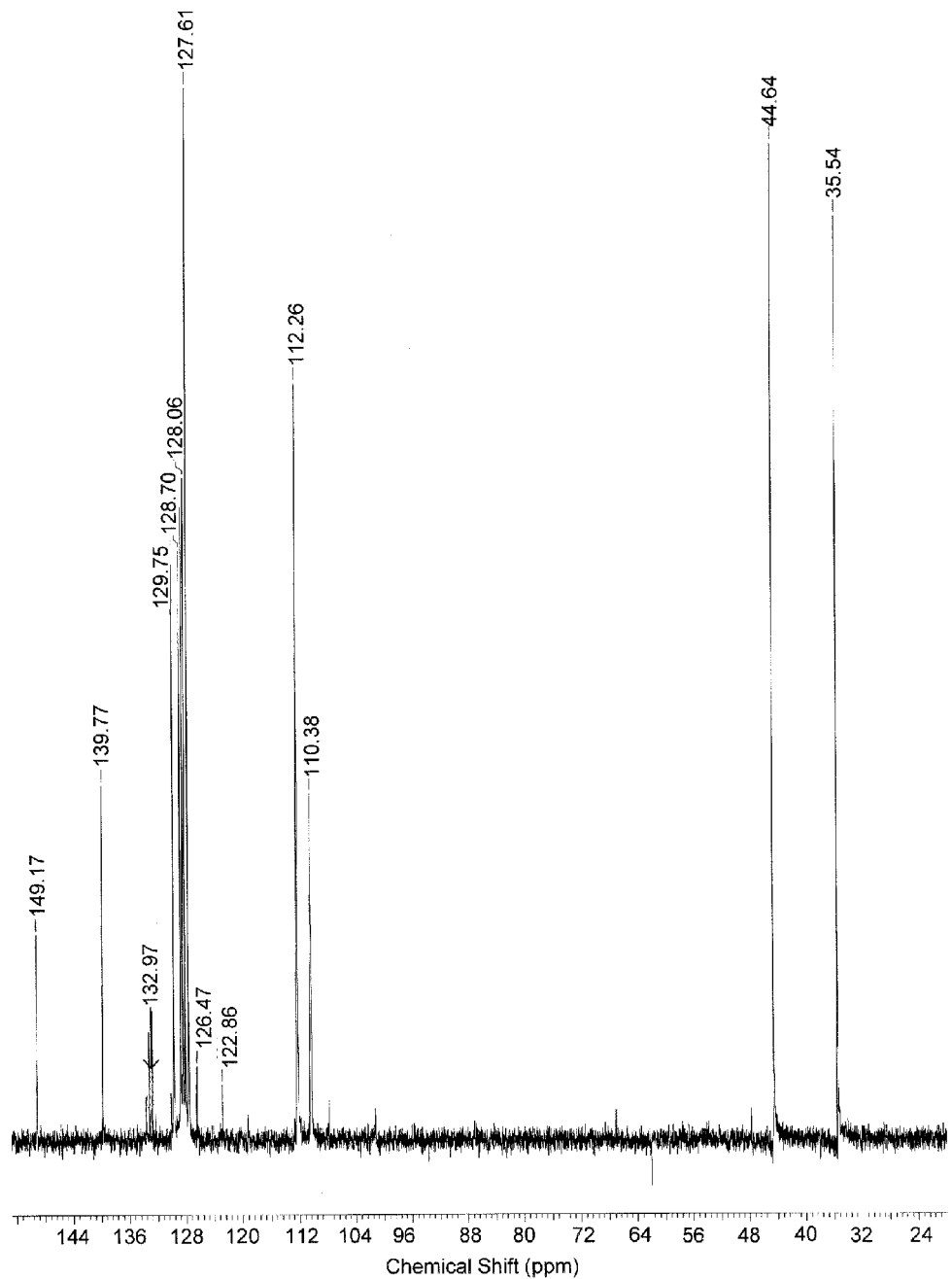
FIG. 14 is a $^{13}$C{$^1$H} NMR spectrum of (3—R=3,5-bis-(trifluoromethyl)phenyl) in C$_6$D$_6$.

As shown in FIG. 12, to a 100 mL round bottom flask charged with toluene (50 mL) were added 1,3-bis-(2aminoethyl)benzene (1.50 g, 9.15 mmol), 3,5-bis(trifluoromethyl) bromobenzene (5.37 g, 2 equiv, 18.3 mmol), $Pd_2(dba)_3$ (0.13 g, 0.5%, 0.142 mmol), rac-BINAP (023 g, 1.5%, 0.357 mmol), and $NaO^tBu$ (2.64 g, 27.5 mmol). After refluxing for 72 h under argon the solution was filtered hot through celite and volatiles were removed in vacuo. Nonvolatile products were dissolved in hot pentanes and filtered through celite. The final product was recrystallized twice from pentane at −20° C. Yield 2.1 g (3.57 mmol, 39%). ¹H NMR (300 MHz, $C_6D_6$, δ): 7.22 (s, 2H, Ar—H), 7.11 (t, J=7.64 Hz, 1H, Ar—H), 6.81 (dd, J=7.64, 1.70 Hz, 2H, Ar—H), 6.72 (s, 1H, Ar—H), 6.48 (s, 4H, Ar—H), 3.13 (t, J=5.52 Hz, 2H, NH), 2.73 (dt, J=6.94 Hz, 4H, —$NHCH_2CH_2$—), 2.38 (t, J=6.94 Hz, 4H, —$NHCH_2CH_2Ar$) as shown in FIG. 13. ¹³C{1H} NMR (128.39 Hz, $C_6D_6$, δ): 35.5 (s, —$NHCH_2CH_2Ar$), 44.6 (s, $NHCH_2CH_2Ar$), 110.4 (s, aromatic), 112.3 (s, aromatic), 122.9 (s, aromatic), 126.5 (s, aromatic), 127.6 (s, aromatic), 129.8 (s, aromatic), 133.0 (q, $J_{C-F}$=32.7 Hz, —CF3), 139.8 (s, $ArCCH_2$—), 149.2 (s, ArCNH) as shown in FIG. 14. HRMS calculated (found) for $C_{26}H_{20}F_{12}N_2$ (M+H)⁺: 589.1508 (589.1537).

X-ray Data for (3—R=3,5-bis(trifluoromethylphenyl) were collected at 173K on a Siemens SMART PLATFORM equipped with A CCD area detector and a graphite monochromator utilizing $MoK_\alpha$ radiation (λ=0.71073 Å). Cell parameters were refined using up to 8192 reflections. A full sphere of data (1850 frames) was collected using the co-scan method (0.3° frame width). The first 50 frames were re-measured at the end of data collection to monitor instrument and crystal stability (maximum correction on I was <1%). Absorption corrections by integration were applied based on measured indexed crystal faces.

Figure 15:
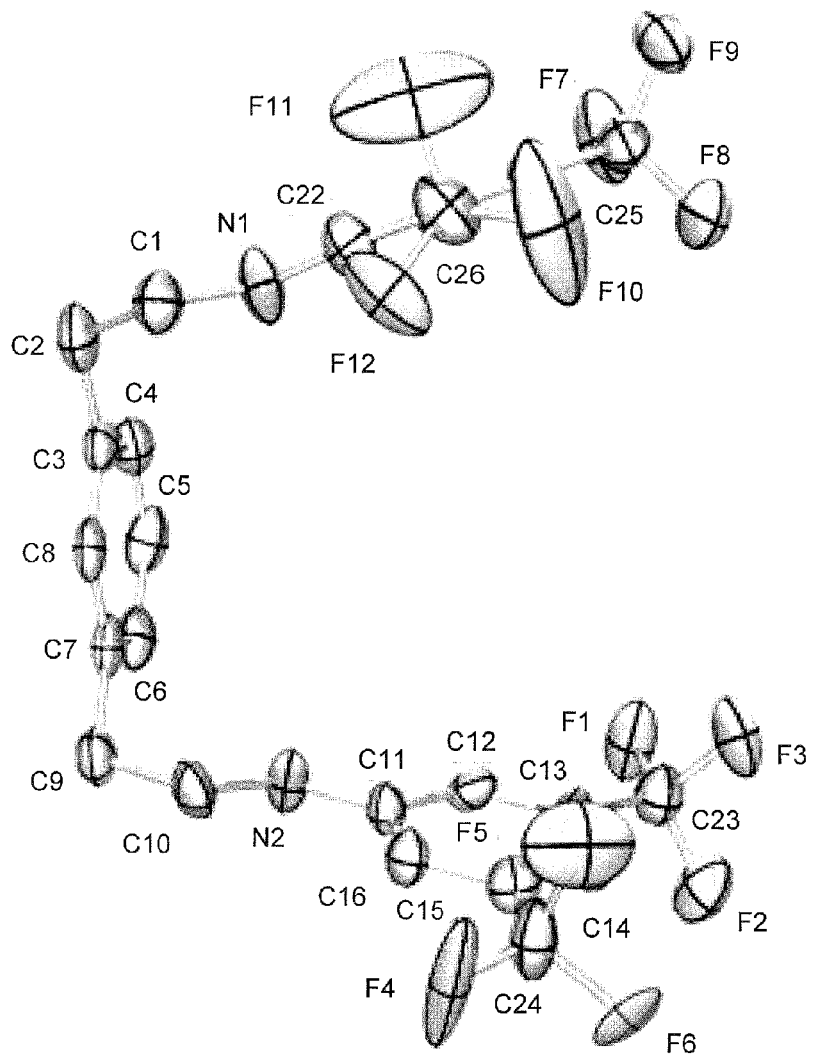
FIG. 15 is an Ortep drawing of the molecular structure of (3—R=3,5-bis-(trifluoromethyl)phenyl) with ellipsoids presented at the 50% probability level.

The structure was solved by the Direct Methods in SHELYTL6, and refined using full-matrix least squares. The non-H atoms were treated anisotropically, whereas the hydrogen atoms were calculated in ideal positions and were riding on their respective carbon atoms. The asymmetric unit consists of two chemically equivalent but crystallographically independent molecules. They differ by the orientations of the side aryl rings with respect to the central one. Out of the eight $CF_3$ groups, six of them are disordered and were refined in two parts each. A total of 890 parameters were refined in the final cycle of refinement using 10886 reflections with I>2σ(I) to yield $R_1$ and $wR_2$ of 6.33% and 13.87%, respectively. Refinement was done using $F^2$. The Ortep drawing is given in FIG. 15

TABLE 5

Crystal data, structure solution and refinement for (3 – R = 3,5-bis(trifluoromethylphenyl).

| | |
|---|---|
| identification code | ac04 |
| empirical formula | $C_{26}H_{20}F_{12}N_2$ |
| formula weight | 588.44 |
| T (K) | 173(2) |
| λ (Å) | 0.71073 |
| Crystal system | Triclinic |
| space group | P-1 |
| a (Å) | 11.9159(14) |
| b (Å) | 14.003(2) |
| c (Å) | 16.6156(18) |
| α (deg) | 75.343(2) |
| β (deg) | 71.727(2) |
| γ (deg) | 74.212(2) |
| V (Å³) | 2490.3(5) |
| Z | 4 |
| $\rho_{calcd}$ (Mg mm⁻³) | 1.570 |
| Crystal size (mm³) | 0.11 × 0.08 × 0.05 |
| abs coeff (mm⁻¹) | 0.156 |
| F(000) | 1192 |
| θ range for data collection | 1.31 to 22.50 |
| limiting indices | −11 ≤ h ≤ 12, −15 ≤ k ≤ 13, −12 ≤ l ≤ 17 |
| no. of reflns collcd | 10886 |
| no. of ind reflns ($R_{int}$) | 6488 (0.1286) |
| completeness to θ = 27.49° | 99.8% |
| absorption corr | Integration |
| refinement method | Full-matrix least-squares on $F^2$ |
| data/restraints/parameters | 6488/0/890 |
| R1,[a] wR2[b] [I > 2σ] | 0.0633, 0.1387 |
| R1,[a] wR2[b] (all data) | 0.1350, 0.1701 |
| GOF[c] on $F^2$ | 0.896 |
| largest diff. peak and hole | 0.310 and −0.263 e.Å⁻³ |

[a]$R1 = \Sigma||F_o| - |F_c||/\Sigma|F_o|$.
[b]$wR2 = (\Sigma(w(F_o^2 - F_c^2)^2)/\Sigma(w(F_o^2)^2))^{1/2}$.
[c]$GOF = (\Sigma w(F_o^2 - F_c^2)^2/(n - p))^{1/2}$ where n is the number of data and p is the number of parameters refined.

Synthesis of (4—R=3,5-bis(trifluoromethyl)phenyl)

Figure 16:
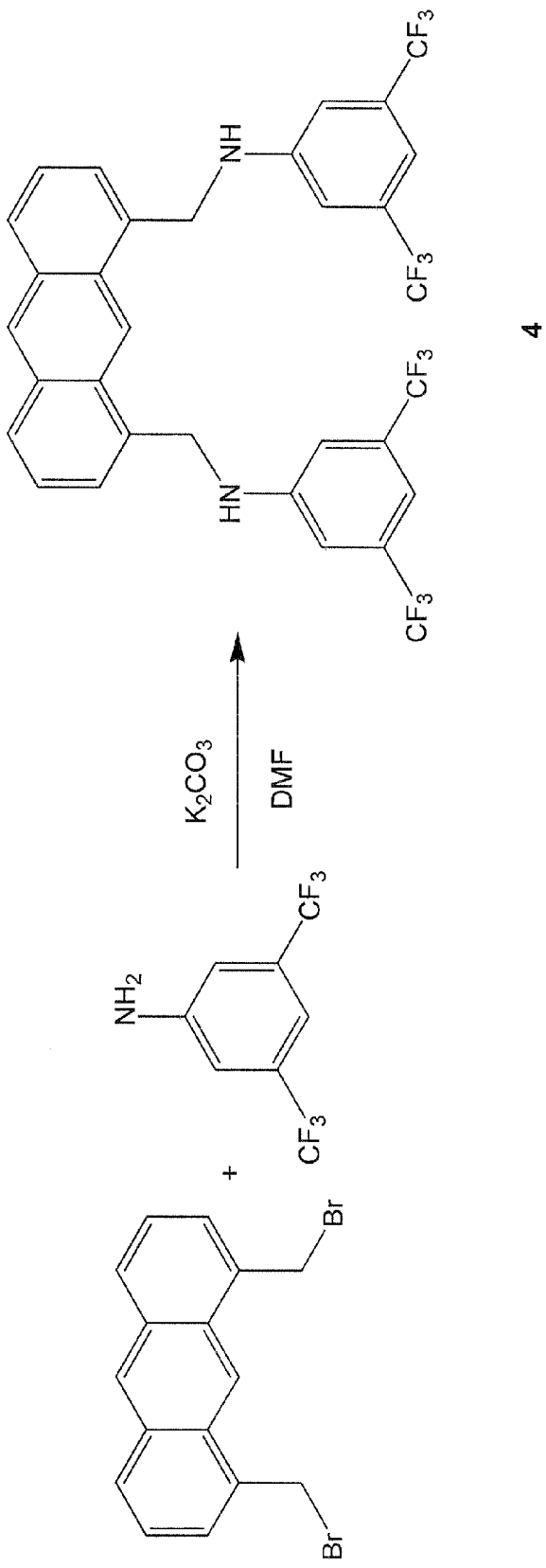
FIG. 16 is a reaction scheme for the preparation of NCN ligand 4—R=3,5-bis-(trifluoromethyl)phenyl according to an embodiment of the invention.
Figure 17:
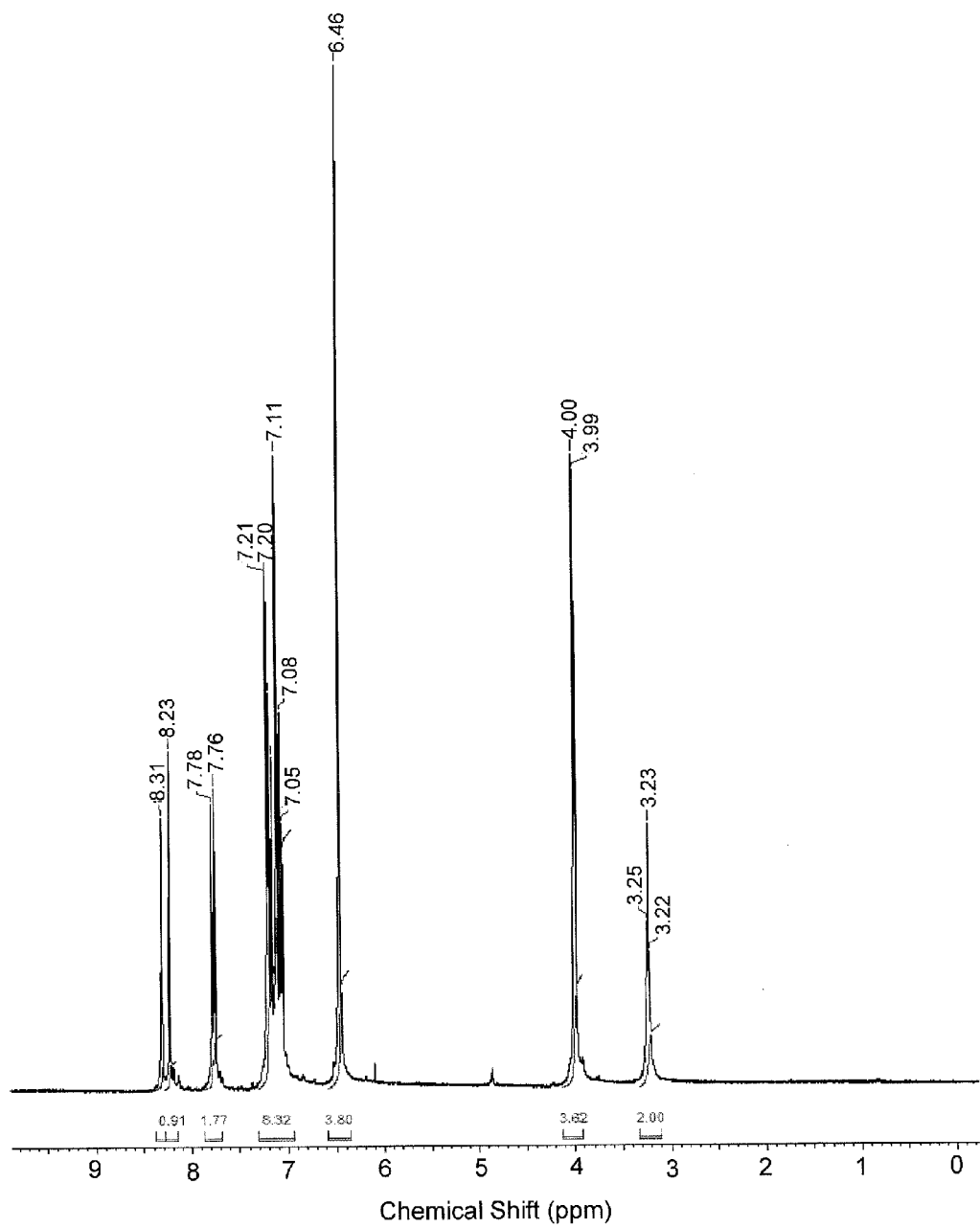
FIG. 17 is a $^1$H NMR spectrum of (4—R=3,5-bis-(trifluoromethyl)phenyl) in C$_6$D$_6$.
Figure 18:
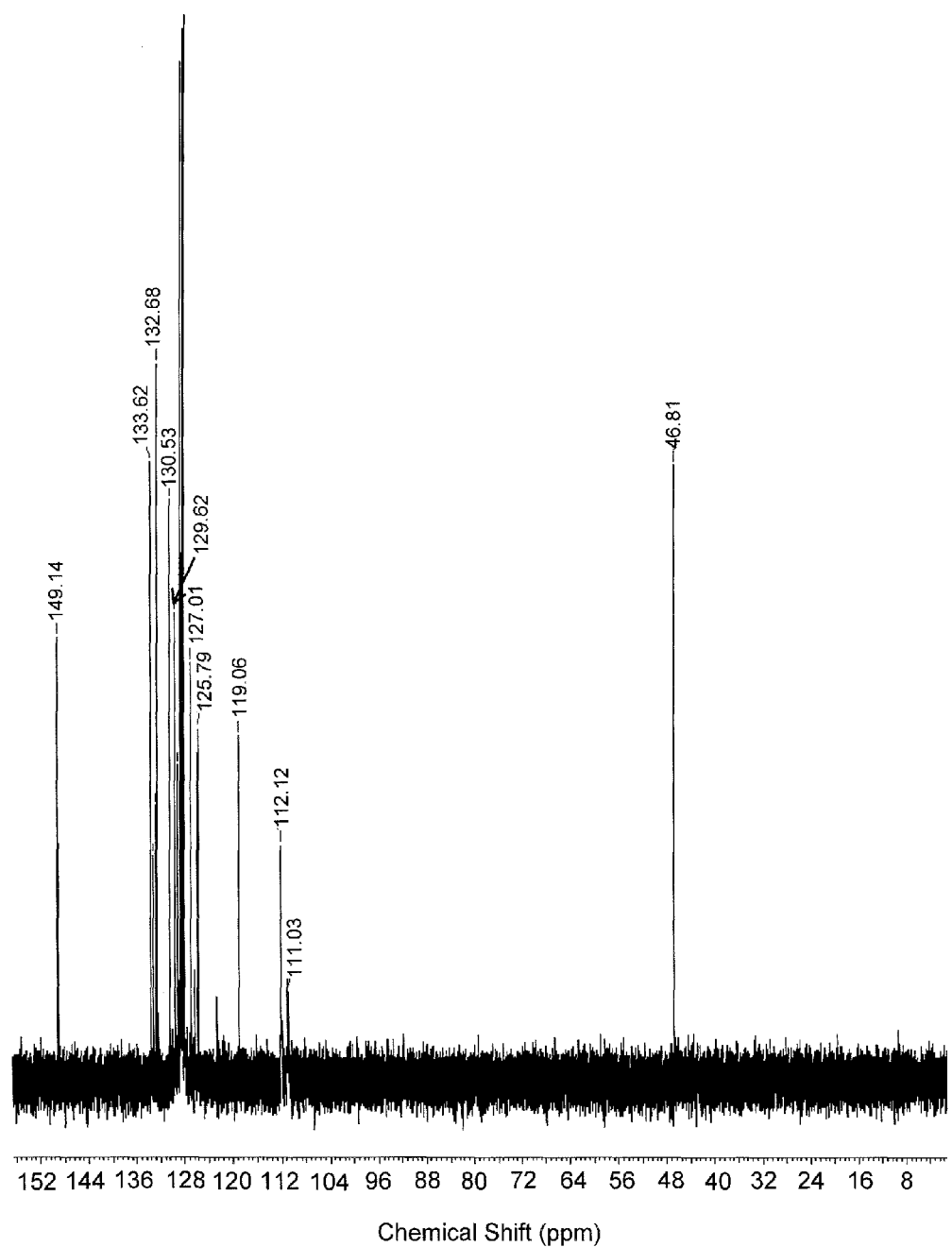
FIG. 18 is a $^{13}$C NMR spectrum of (4—R=3,5-bis-(trifluoromethyl)phenyl) in C$_6$D$_6$.

As shown in FIG. 16, to an anhydrous DMF (15 mL) solution of bis(bromomethylene)anthracene (2.81 g, 7.72 mmol) and $K_2CO_3$ was added 3,5-bis(trifluormethyl)aniline (2.65 ml, 17.0 mmol). The mixture was stirred for 15 h and then water was added to form a yellow oil layer. The yellow oil was extracted with CHCl₃, washed with water, brine, dried with MgSO₄, and then filtered. After removing all volatiles, an oil forms with some yellow solid. The oil was dissolved in hexanes and the yellow solid (bis(bromomethylene)anthracene starting material) was removed by filtration. The oil contained 4—R=3,5-bis(trifluoromethyl)phenyl, aniline, and DMF which was separated by flash column chromatography (100 g SiO₂, 1:1 CHCl₃:pentane) to provide pure 4—R=3,5-bis(trifluoromethyl)phenyl as a pale yellow solid. Yield 2.36 g (3.57 mmol, 46%). ¹H NMR (300 MHz, C₆D₆, δ): 8.31 (s, 1H, Ar H), 8.23 (s, 1H, Ar H), 7.77 (d, J=6 Hz, 2H, Ar H), 7.0-7.4 (m, 6H, Ar H), 6.49 (s, 4H, o-CHCF₃), 4.00 (d, J=3.0 Hz, 4H, N—CH₂—), 3.23 (t, J=3.0 Hz, 2H, NH) as shown in FIG. 17. ¹³C{¹H} NMR (128.39 C₆D₆, δ): 46.8 (s, CH₂), 111.0 (s, aromatic), 112.1 (s, aromatic), 119.1 (s, aromatic), 125.8 (s, aromatic), 127.0 (s, aromatic), 129.1 (s, aromatic), 129.6 (s, aromatic), 130.5 (s, aromatic), 132.7 (s, aromatic), 133.1 (q, J_CF=33.1 Hz, CF₃), 133.6 (s, aromatic), 149.1 (s, i-C—NH) as shown in FIG. 18. HRMS calculated (found) for C₃₂H₂₀F₁₂N₂ (M⁺): 660.14 (660.1465).

Synthesis of (5—R=Si^iPr₃)

Figure 19:
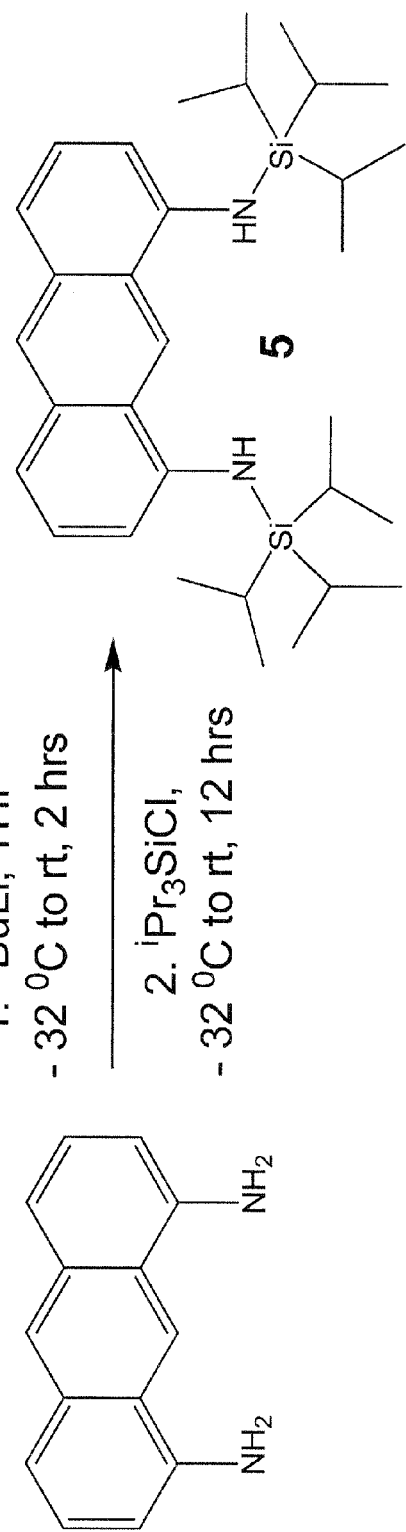
FIG. 19 is a reaction scheme for the preparation of NCN ligand 5—R=Si$^i$Pr$_3$ according to an embodiment of the invention.
Figure 20:
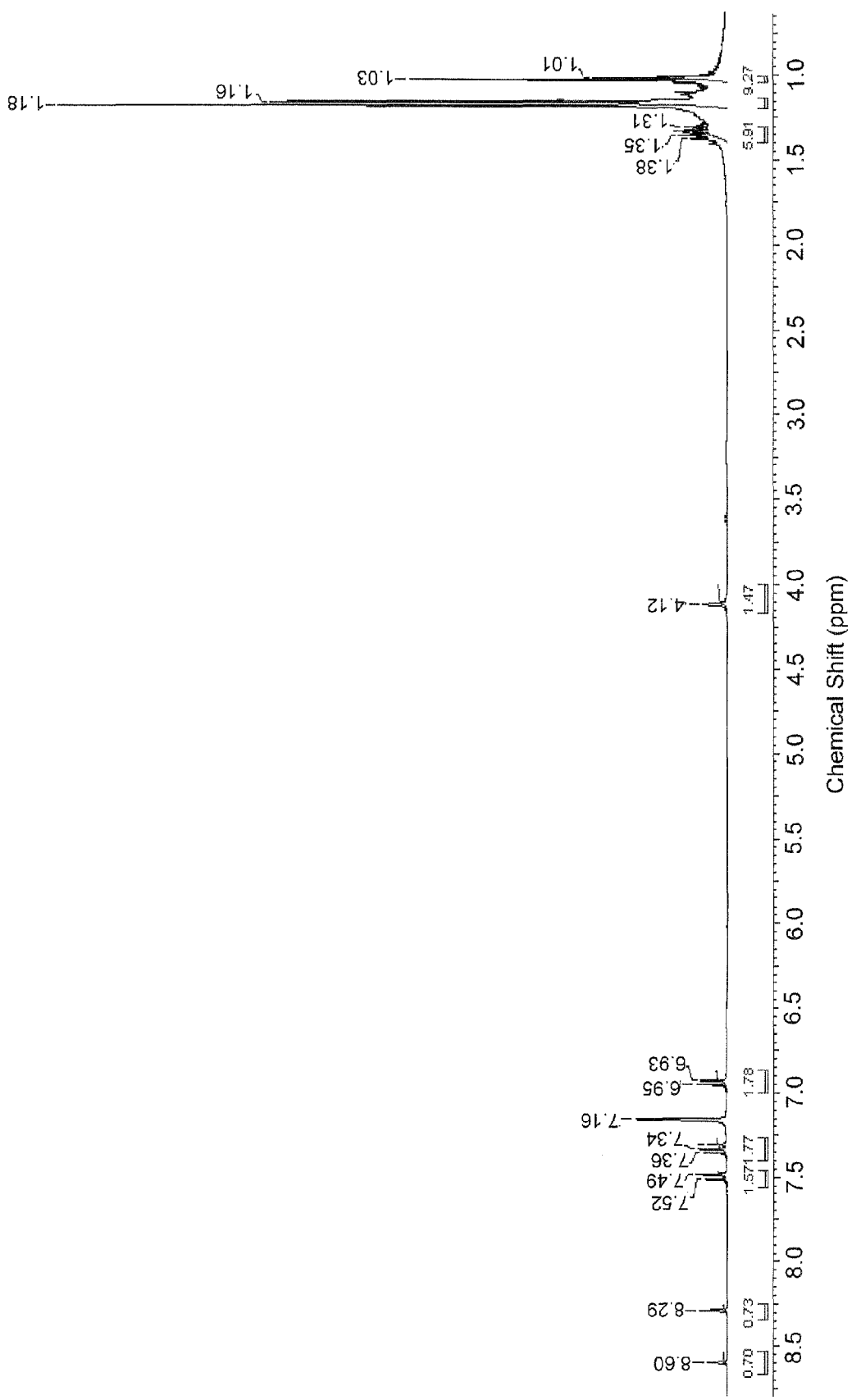
FIG. 20 is a $^1$H NMR spectrum of (5—R=Si$^i$Pr$_3$) in C$_6$D$_6$.
Figure 21:
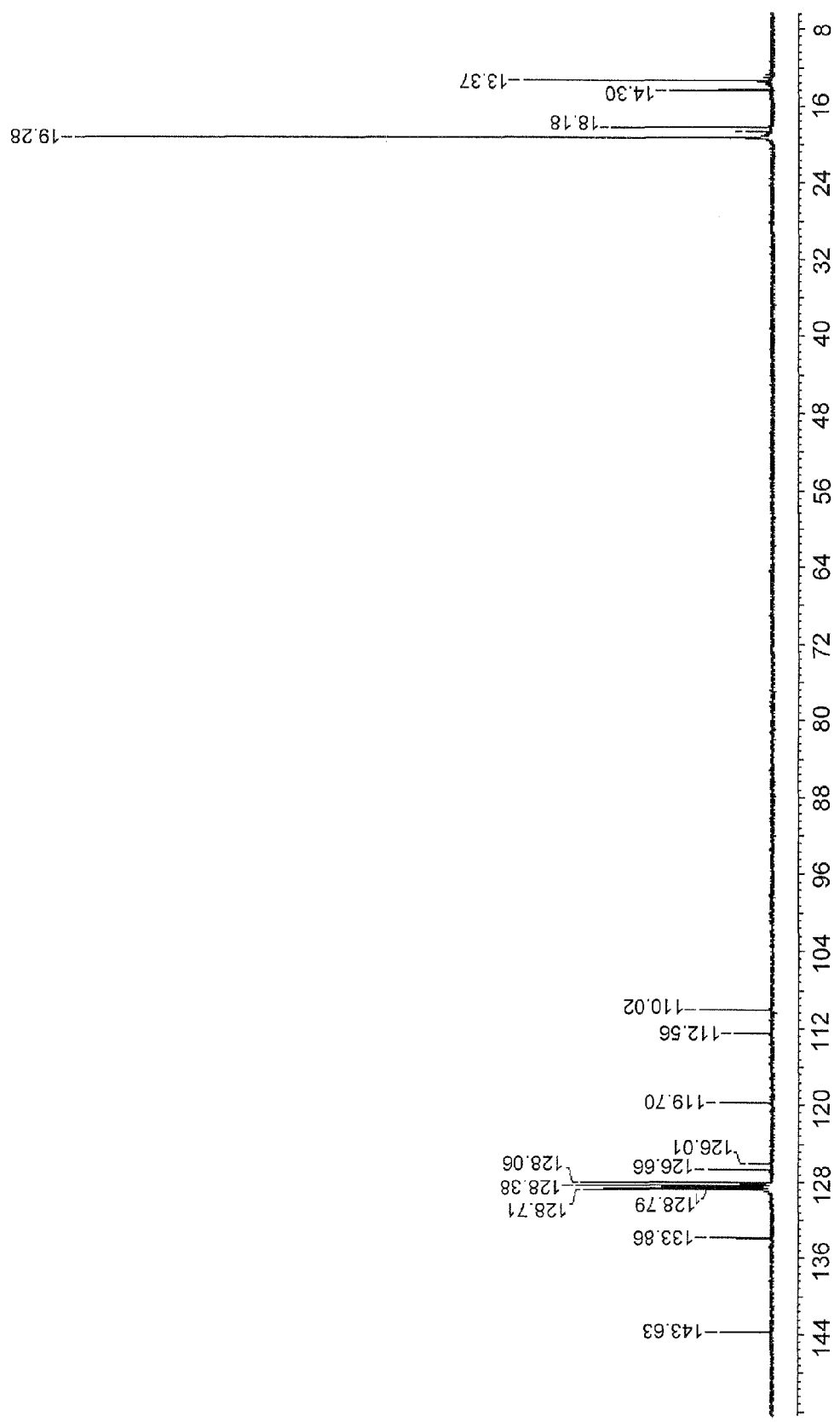
FIG. 21 is a $^{13}$C{$^1$H} NMR spectrum of (5—R=Si$^i$Pr$_3$) in C$_6$D$_6$.

As shown in FIG. 19, a solution of 1,8-anthracenediamine, (208 mg, 1 mmol) in tetrahydrofuran (10 mL) was cooled to −32° C., and ⁿBuLi (0.81 mL, 2.5 M solution in hexane, 2.01 mmol) was then added. The reaction mixture was slowly warmed to room temperature and was stirred for 2 h. The resulting mixture was then again cooled to −32° C., and to this ^iPr₃SiCl (0.43 mL, 2.01 mmol) was added very slowly over a period of 5 minutes. The mixture was slowly brought to room temperature and was continuously stirred for 12 h. The solvent was removed under vacuum and dried 2 hours. The crude product was extracted into hexanes (10 mL). The solvent was removed under vacuum to yield a viscous dark brown oil (450 mg, 87%). ¹H NMR (300 MHz, C₆D₆) δ (ppm): 8.60 (s, 1H, Ar—H), 8.29 (s, 1H, Ar—H), 7.50 (d, J=8.6 Hz, 2H, Ar—H), 7.34 (t, J=8.6 Hz, J=7.3 Hz, 2H, Ar—H), 6.94 (d, J=7.3 Hz, 2H, Ar—H), 4.12 (bs, 2H, N—H), 1.31-1.40 (m, 6H, ^iPr—CH), 1.17 (d, J=7.0 Hz, 27H, ^iPr—CH₃), 1.02 (d, J=3.0 Hz, 9H, ^iPr—CH₃) as shown in FIG. 20. ¹³C{¹H} NMR (75.36 Hz, C₆D₆) δ (ppm): 143.6 (s, C, Ar), 133.9 (s, C, Ar), 128.8 (s, C, Ar), 126.7 (s, C, Ar), 126.0 (s, C, Ar), 119.7 (s, C, Ar), 110.7 (s, C, Ar), 19.3 (s, ^iPr—CH), 18.2 (^iPr—CH₃), 14.3 (s, ^iPr—CH), 13.4 (^iPr—CH₃) as shown in FIG. 21. ESI-MS, [M]⁺=520.3685 (C₃₂H₅₂N₂Si₂, theoretical=520.3664), [M+H]⁺=521.3754 (C₃₂H₅₃N₂Si₂, theoretical=521.3742), [2M+H]⁺=1041.7443 (C₆₄H₁₀₅N₄Si₄, theoretical=1041.7411).

Synthesis of 1,3-bis(7-methyl-1H-indol-2-yl)benzene (6)

As shown in FIG. 21, the synthesis involves a Madelung synthesis of indoles. A stirred solution of diamide (0.54 g 1.45 mmol) in 100 mL of dry THF maintained under a N₂ atmosphere was maintained at an internal temperature of −35° C. and treated dropwise with 5.8 mmol of ⁿBuLi. The stirred mixture was kept at ambient temperature overnight, cooled in an ice bath, and treated dropwise with of 2 N HCl. The organic layer was separated and the aqueous layer washed with ether. The combined organic layers were dried with anhydrous MgSO₄, filtered, and concentrated in vacuo to obtain an off white solid.

Synthesis of Cr(III) NCN pincer ligand (11)

Figure 22:
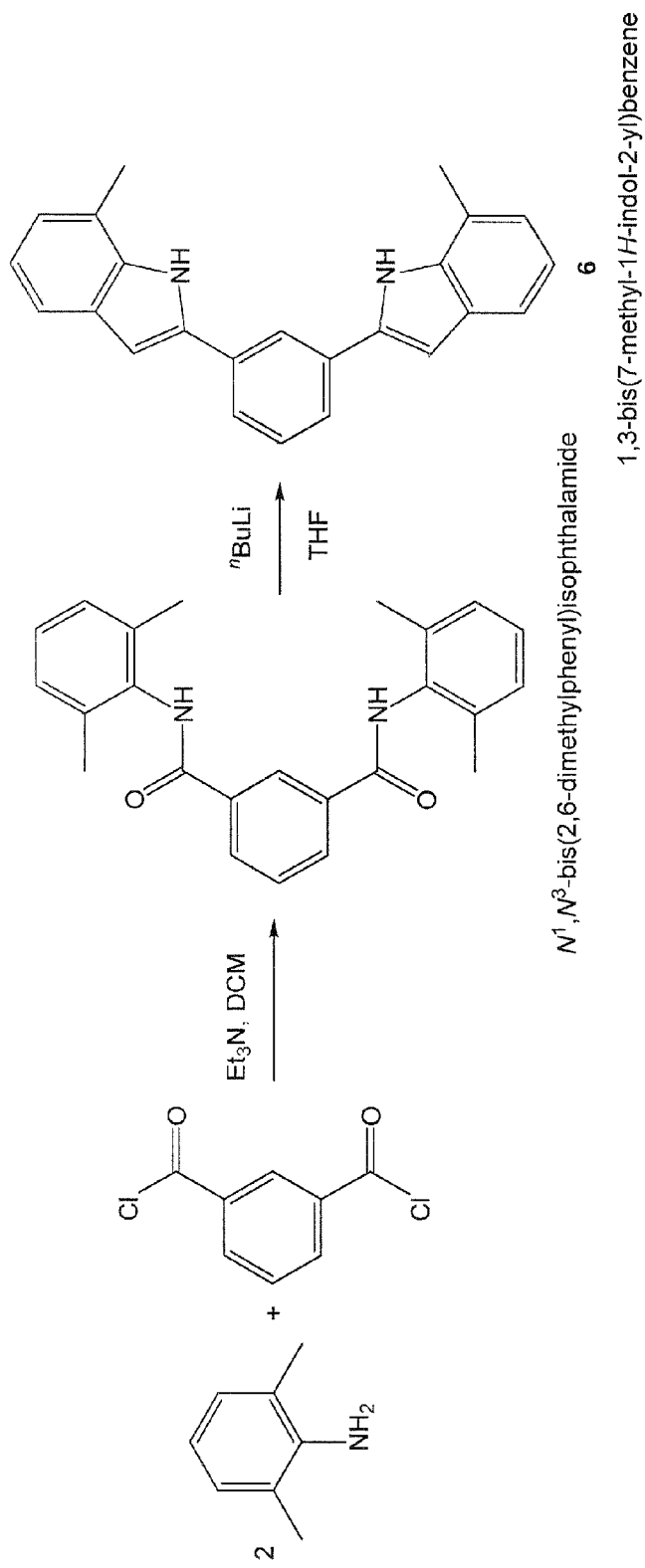
FIG. 22 is a reaction scheme for the preparation of the Cr NCN trianionic pincer ligand NCNCr$^{III}$(THF)$_3$ 11 according to an embodiment of the invention.
Figure 22:
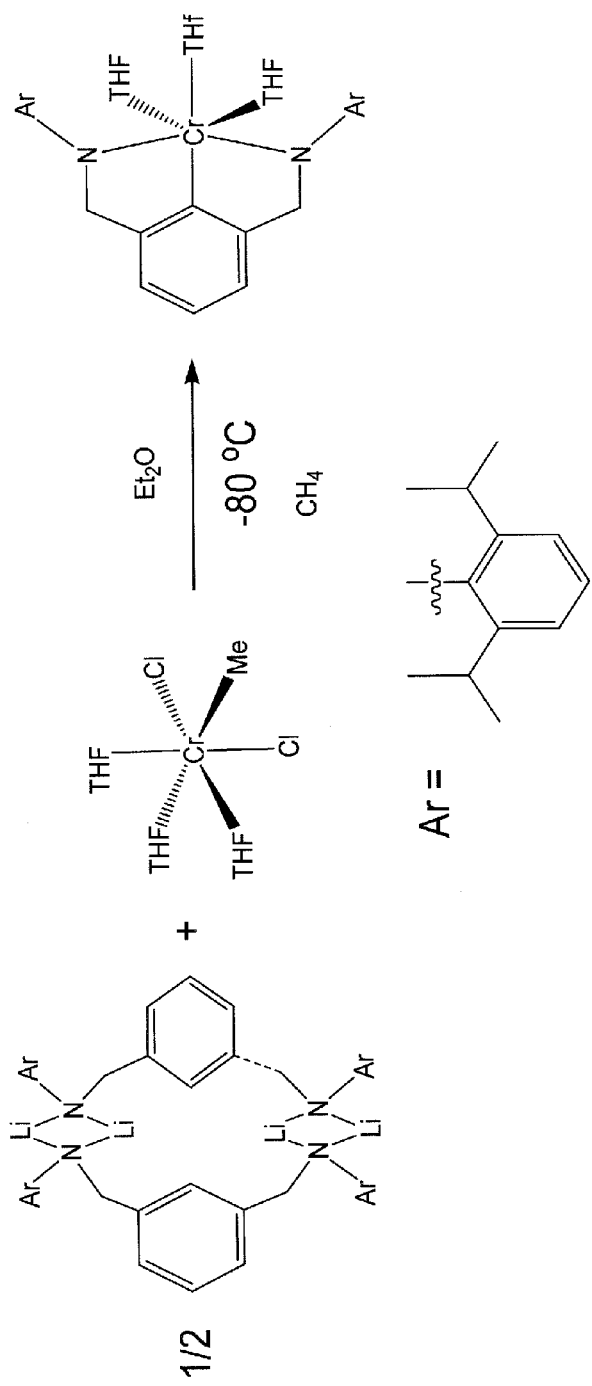
Figure 23:
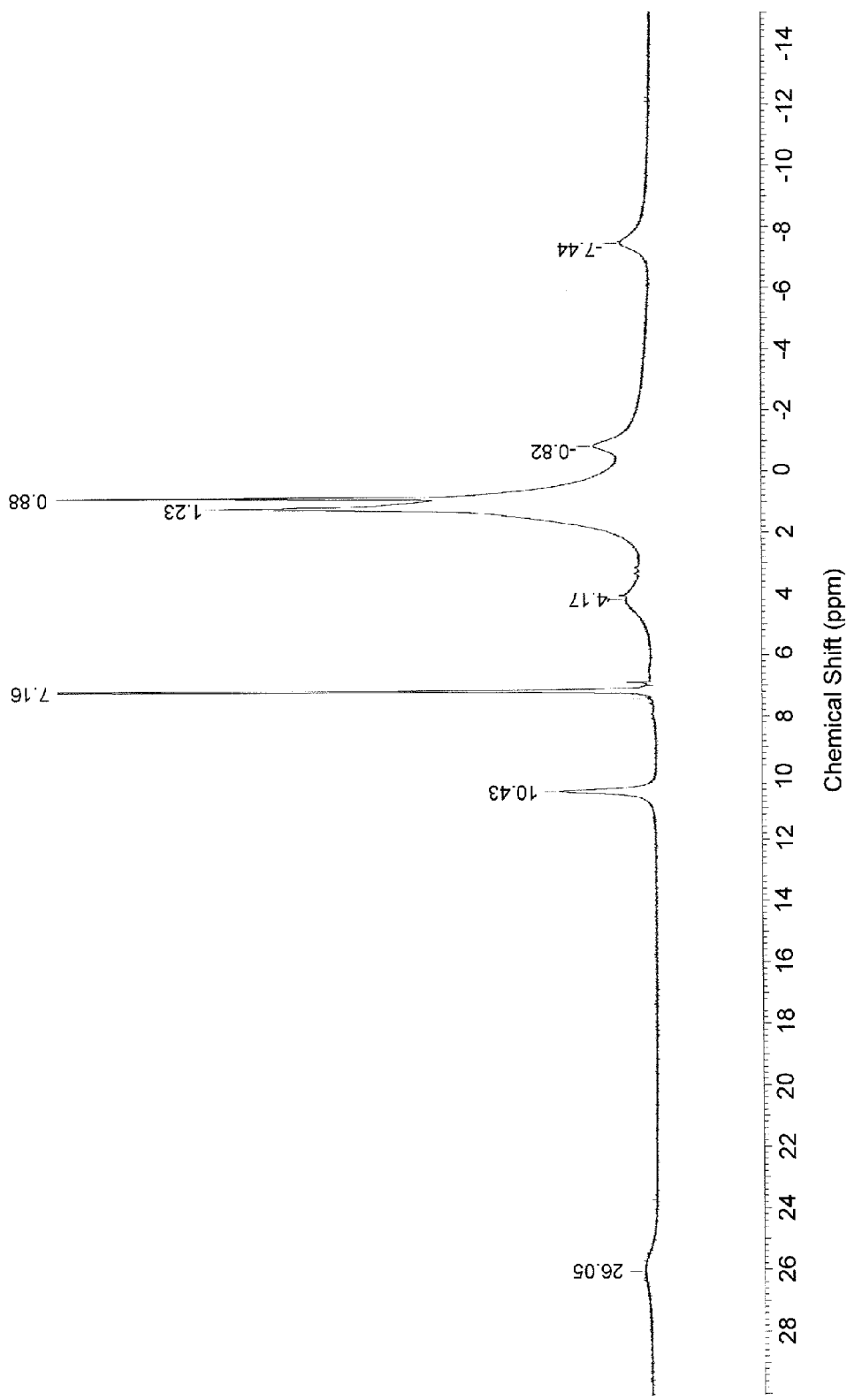
FIG. 23 is a $^1$H NMR spectrum of NCNCr$^{III}$(THF)$_3$ 11 in C$_6$D$_6$.

An {NCNLi₂}₂ dimer can be prepared from butyl lithium and compound 7—R=3,5-bis-(i-propyl)phenyl. As shown in FIG. 22, the {NCNLi₂}₂ salt (1.0 g, 1.1 mmols) was dissolved in diethyl ether and cooled to −80° C. In a separate vial CrMeCl₂(THF)₃ (0.75 g, 2.1 mmol was dissolved in diethyl ether and cooled to −80° C. The Cr salt solution was slowly added to the NCNLi salt solution while maintaining the temperature at −80° C. After the addition was complete, the combined solution warm to ambient temperature over a 30 minute period while stirring was maintained. The solution was filtered using a medium coarse fitted funnel and the filtrate was collected and volatiles were removed in vacuo to give a dark maroon solid. The solid was triturated with pentane, extracted into pantane and filtered through a fitted funnel. The filtrate was collected and the solvent removed in vacuo. The resulting dark maroon solid was redissolved in a minimal amount of pentane and cooled to −80° C. A NCNCr (THF)₃ complex precipitate was isolated by filtration as a dark maroon microcrystalline powder. Yield 0.53 g (1.04 mmol, 49%). ¹H NMR (300 MHz, C₆D₆, δ): 26.05 (bs, Ar—H), 10.43 (bs, Ar—H), 4.17 (bs, THF), 1.23 (bs, overlapping THF and CH(CH₃)₂ protons), 0.82 (bs, Ar—H), −7.44 (bs, Ar—H) shown in FIG. 23.

It should be understood that the examples and embodiments described herein are for illustrative purposes only and that various modifications or changes in light thereof will be suggested to persons skilled in the art and are to be included within the spirit and purview of this application.

We claim:

1. A Cr(V)OCO³⁻ trianionic pincer ligand complex comprising the structure:

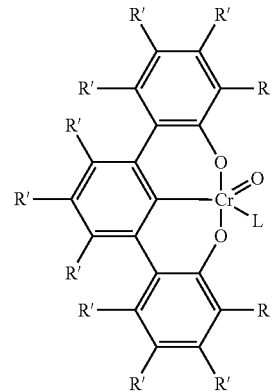

where: R is independently a C3 to C12 alkyl or aryl group;
R' is independently a H, C1 to C12 alkyl or aryl group;
and L is an oxygen comprising ligand.

2. The pincer ligand complex of claim 1, wherein R is t-butyl, R' is H and L is tetrahydrofuran (THF).

3. A catalytic method for oxidation of a substrate comprising the steps of:
providing a Cr(V)OCO³⁻ trianionic pincer ligand complex of claim 1;
providing a source of oxygen molecules; and
providing a substrate, wherein said substrate is oxidized and said Cr(V)OCO³⁻ trianionic pincer ligand complex is reduced by the substrate to give a Cr(III) complex and oxidizing said Cr(III) complex to said Cr(V)OCO³⁻ trianionic pincer ligand complex.

4. The method of claim 3, wherein said substrate comprises a phosphine, amine, sulfide, alkene, alkane or a second metal complex.

5. The method of claim 3, wherein said Cr(V)OCO³⁻ trianionic pincer ligand complex comprises:

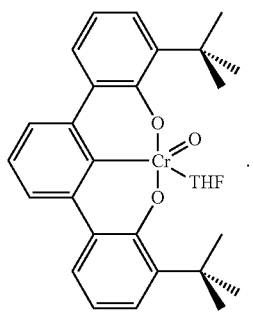

6. A method of preparing Cr(V)OCO$^{3-}$ trianionic pincer ligand complex of claim 1 comprising the steps of:
providing an OCOH$_3$ pincer ligand;
converting said OCOH$_3$ pincer ligand to an OCOHM$_2$ pincer complex;
exchanging said OCOHM$_2$ pincer complex with a Cr(III) salt; and
oxidizing said Cr(III) to Cr(V).

7. The method of claim 6, wherein said OCOH$_3$ pincer ligand comprises ($^t$BuOCO)H$_3$.

8. The method of claim 6, wherein said OCOHM$_2$ pincer complex comprises an OCOHK$_2$ pincer complex by reaction of said OCOH$_3$ pincer ligand with KH.

9. The method of claim 6, wherein said Cr(III) salt comprises CrCl$_2$Me(THF)$_3$.

10. The method of claim 6, wherein said oxidation comprises oxidation in an oxygen comprising gas.

11. An NCN pincer ligand, comprising a structure selected from:

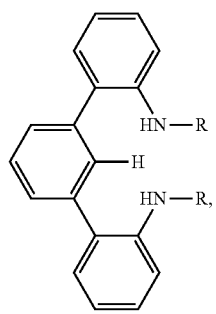

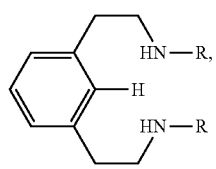

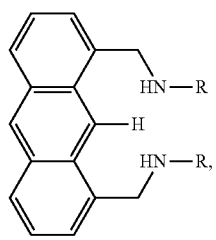

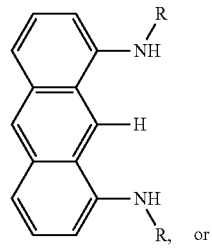

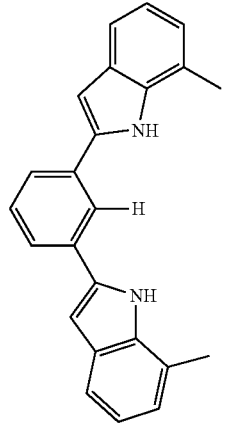

wherein R is 2,6-bis-(i-propyl)phenyl, 3,5-bis-(methyl)phenyl, 3,5-bis-(i-propyl)phenyl 3,5-bis-(trifluoromethyl)phenyl, mesytyl, or tri-i-propylsilyl.

12. The NCN pincer ligand of claim 11, wherein the ligand is:

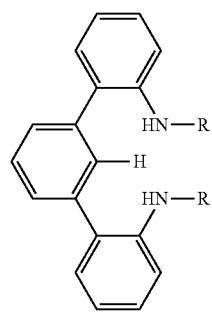

wherein R is mesytyl.

13. The NCN pincer ligand of claim 11, wherein the ligand is:

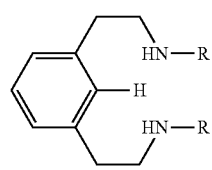

wherein R is 3,5-bis-(trifluoromethyl)phenyl.

14. The NCN pincer ligand of claim 11, wherein the ligand is:

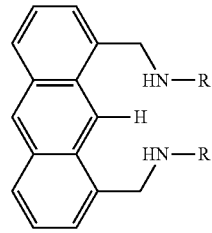

wherein R is 3,5-bis-(trifluoromethyl)phenyl.

15. The NCN pincer ligand of claim 11, wherein the ligand is:

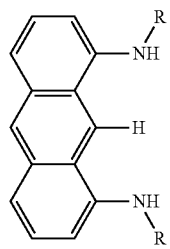

wherein R is tri-i-propylsilyl.

16. The NCN pincer ligand of claim 11, wherein the ligand is:

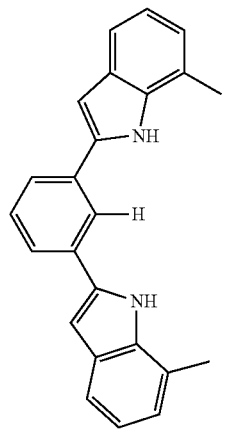

17. A Cr(III)NCN$^{3-}$ trianionic pincer ligand complex comprising the structure:

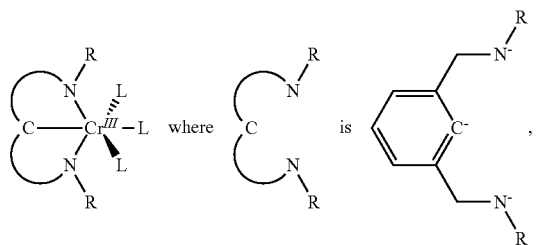

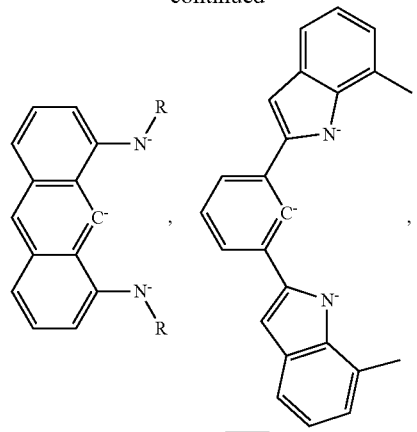

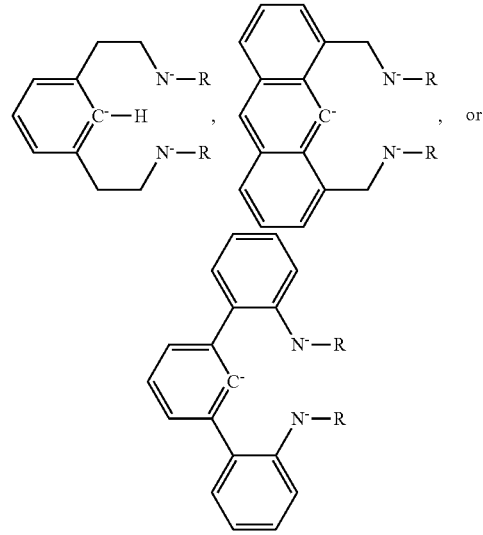

where R is 2,6-bis-(i-propyl)phenyl, 3,5-bis-(methyl)phenyl, 3,5-bis-(trifluoromethyl)phenyl, 3,5-bis-(i-propyl)phenyl, mesytyl, or tri-i-propylsilyl and L is any neutral coordinating ligand.

18. The Cr(III)NCN$^{3-}$ trianionic pincer ligand complex of claim 17, wherein the complex is:

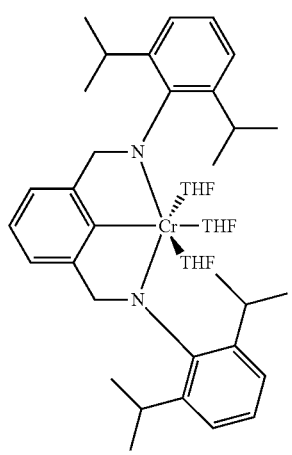

UNITED STATES PATENT AND TRADEMARK OFFICE
CERTIFICATE OF CORRECTION

PATENT NO. : 8,846,950 B2
APPLICATION NO. : 13/254510
DATED : September 30, 2014
INVENTOR(S) : Veige et al.

It is certified that error appears in the above-identified patent and that said Letters Patent is hereby corrected as shown below:

In the Specification

Column 3,
Line 46, "a $^{13}$C NMR spectrum" should read --a $^{13}$C{$^{1}$H} NMR spectrum--.

Column 9,
Line 24, "standard Schienk" should read --standard Schlenk--.

Column 10,
Lines 14-15, "C, 71.67%; 7.60%. Found; C, 71.24%; H, 8.16%." should read
--C: 71.67%; H: 7.60%, Found; C: 71.24%; H 8.16%.--.
Lines 29-30, "137 ppm" should read --2.37 ppm--.
Lines 34-35, "C, 72.15%; H, 7.05%. Found; C, 72.37%; H, 6.68%." should read
--C: 72.15%; H: 7.05%, Found; C: 72.37%; H 6.68%.--.

Column 13,
Line 42, "(trifluoromethylpaniline)" should read --(trifluoromethyl)aniline)--.

Column 14,
Line 6, "co-scan method" should read --ω-scan method--.
Line 13, "SHELYTL6" should read --SHELXTL6--.

Column 16,
Line 9, "coarse fitted" should read --coarse fritted--.
Line 12, "a fitted" should read --a fritted--.

Signed and Sealed this
Second Day of June, 2015

Michelle K. Lee
*Director of the United States Patent and Trademark Office*